United States Patent
Fan et al.

(10) Patent No.: US 11,772,808 B2
(45) Date of Patent: Oct. 3, 2023

(54) DESPIN AND ROTATIONAL CONTROL ARCHITECTURES FOR LIGHTER-THAN-AIR HIGH ALTITUDE PLATFORMS

(71) Applicant: Aerostar International, LLC, Columbia, MD (US)

(72) Inventors: Aaron Fan, Redwood City, CA (US); Jonathan Nutzmann, Redwood City, CA (US); Christopher Bowles, Hollister, CA (US); Ewout van Bekkum, Sunnyvale, CA (US)

(73) Assignee: Aerostar International, LLC, Sioux Falls, SD (US)

( * ) Notice: Subject to any disclaimer, the term of this patent is extended or adjusted under 35 U.S.C. 154(b) by 368 days.

(21) Appl. No.: 16/950,094

(22) Filed: Nov. 17, 2020

(65) Prior Publication Data
US 2022/0153424 A1    May 19, 2022

(51) Int. Cl.
*B64D 31/06*    (2006.01)
*B64D 27/24*    (2006.01)
*B64B 1/30*     (2006.01)

(52) U.S. Cl.
CPC ............... *B64D 31/06* (2013.01); *B64B 1/30* (2013.01); *B64D 27/24* (2013.01)

(58) Field of Classification Search
CPC .... B64B 1/40; B64B 1/30; B64B 1/44; B64B 1/00; B64B 1/24; B64B 1/34; B64B 1/36; B64C 13/0421; B64C 13/16; B64C 27/04; B64C 37/02; B64C 43/00; G01S 15/86; G01S 15/93; G06T 2207/30212;
(Continued)

(56) References Cited

U.S. PATENT DOCUMENTS

| | | |
|---|---|---|
| 3,114,518 A | 12/1963 | Fischell |
| 3,239,699 A | 3/1966 | Ferrary |
| 3,286,630 A | 11/1966 | Seymour et al. |

(Continued)

OTHER PUBLICATIONS

"International Application Serial No. PCT/US2021/059767, International Search Report dated Feb. 8, 2022", 2 pgs.

(Continued)

*Primary Examiner* — Jason H Duger
(74) *Attorney, Agent, or Firm* — Kim and Lahey Law Firm, LLC

(57) ABSTRACT

Aspects of the technology relate to lateral propulsion systems in lighter-than-air (LTA) platforms configured to operate in the stratosphere. One or more motor assemblies are used to actuate the lateral propulsion system and to make directional changes, for instance using one or more propellers. This can include a pointing axis motor assembly for orienting the lateral propulsion system along a particular heading, and a drive motor assembly for causing a propeller assembly or other propulsion mechanism to turn on and off. Corrective actions may be necessary to adjust the alignment of the lateral propulsion system. A stepper motor control module may be used to control operation of the pointing axis motor assembly, for instance by causing it to rotate in a clockwise (or counterclockwise) direction. A motor current control approach may be used, in which the motor voltage is adjusted until a measured motor current reaches a selected current level.

18 Claims, 18 Drawing Sheets

(58) Field of Classification Search
CPC .......... G06T 2207/30252; G06T 7/207; B64D 31/06; B64D 27/24
See application file for complete search history.

(56) References Cited

U.S. PATENT DOCUMENTS

| | | | |
|---|---|---|---|
| 3,985,209 | A | 10/1976 | Glassow |
| 4,373,688 | A | 2/1983 | Topliffe |
| 4,690,350 | A | 9/1987 | Grosso et al. |
| 5,663,624 | A * | 9/1997 | Callaway ............. H02P 8/14 347/37 |
| 5,884,867 | A | 3/1999 | Gordon et al. |
| 6,604,706 | B1 * | 8/2003 | Bostan ............. B64C 39/024 244/6 |
| 7,302,316 | B2 * | 11/2007 | Beard ................ G05D 1/101 340/948 |
| 8,733,697 | B2 | 5/2014 | Devaul et al. |
| 8,897,933 | B1 | 11/2014 | Teller et al. |
| 9,789,960 | B2 | 10/2017 | Hoheisel et al. |
| 2003/0214265 | A1 * | 11/2003 | VanderZee ........... H02P 8/38 318/685 |
| 2006/0046889 | A1 | 3/2006 | Christensen |
| 2013/0151008 | A1 * | 6/2013 | Bosscher ............ B25J 9/1676 700/255 |
| 2018/0043981 | A1 * | 2/2018 | Goelet ................. B64B 1/08 |
| 2020/0191572 | A1 * | 6/2020 | Candido .............. G01C 21/32 |

OTHER PUBLICATIONS

"International Application Serial No. PCT/US2021/059767, Written Opinion dated Feb. 8, 2022", 9 pgs.

Bowman, Max A., et al., Active Camera Stabilization from High Altitude Balloons, Adler Planetarium Chicago, 2017, pp. 1-7.

Flaten, James, et al., Techniques for Payload Stabilization for Improved Photography During Stratospheric Balloon Flights, NASA's Minnesota Space Grant Consortium and University of Minnesota, 2015, pp. 1-8.

Kruger, Andrew, et al., Active Heading Control Platform for Instruments Flown on High Altitude Balloons, Wilbur Wright College, 2017, pp. 1-10.

Poe, Blake, Design and Performance of a Stabilized Pointable Stratospheric Balloon System, A thesis submitted in partial fulfillment of the requirements for the degree of Master of Science in Mechanical Engineering, 2008, pp. 1-173.

* cited by examiner

200

420

440

500

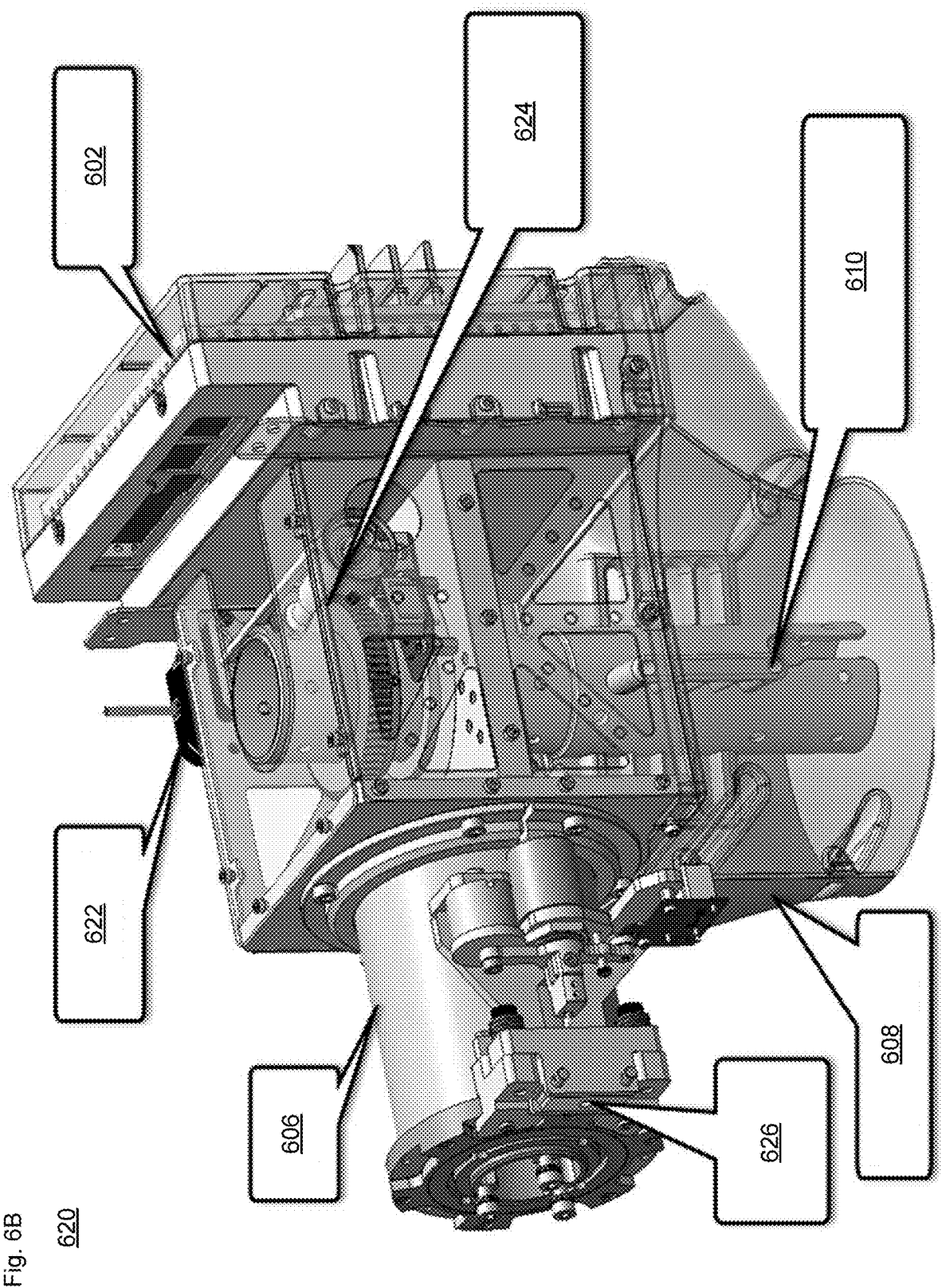

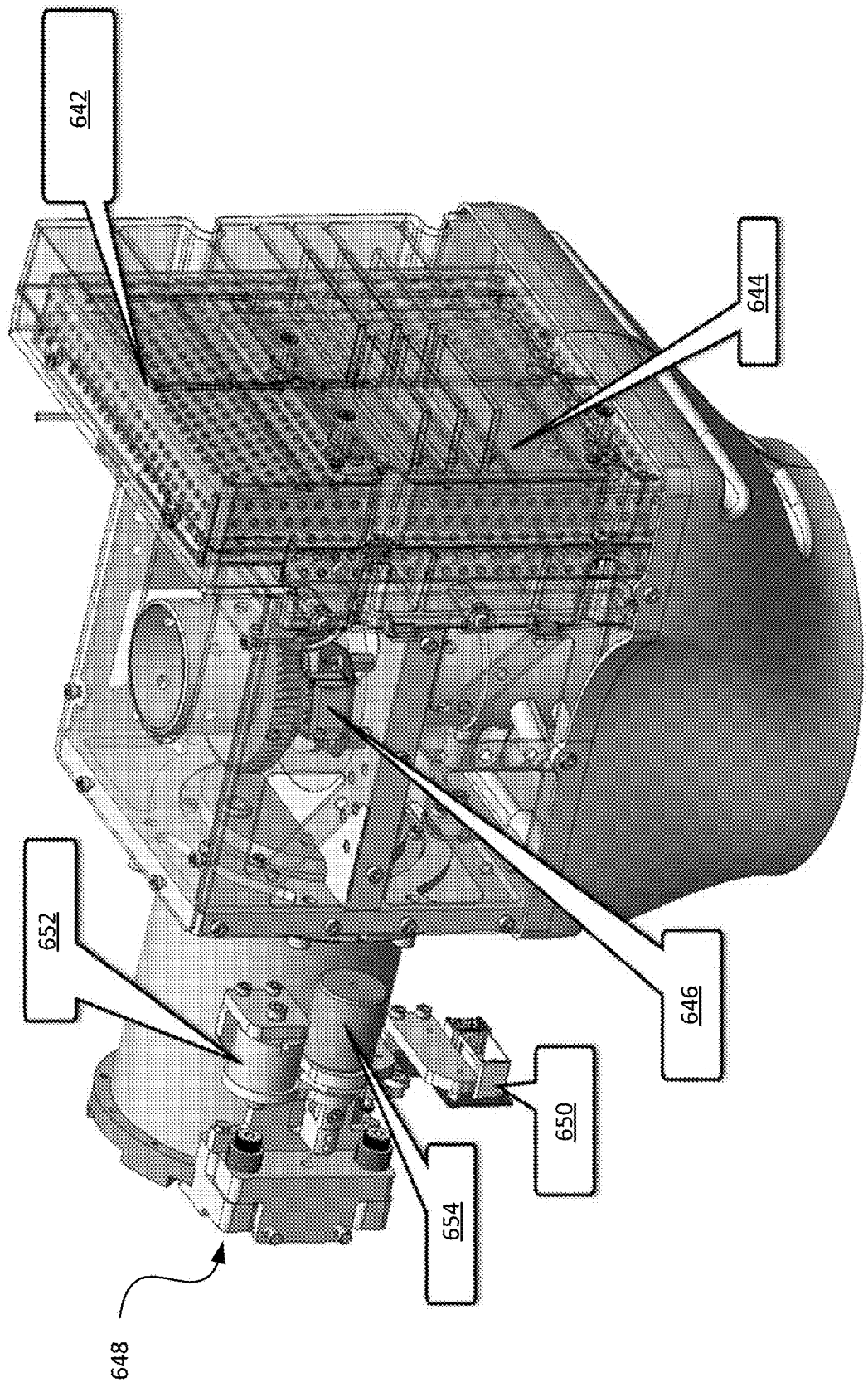

700

DESPIN AND ROTATIONAL CONTROL ARCHITECTURES FOR LIGHTER-THAN-AIR HIGH ALTITUDE PLATFORMS

BACKGROUND

Telecommunications connectivity via the Internet, cellular data networks and other systems is available in many parts of the world. However, there are locations where such connectivity is unavailable, unreliable or subject to outages from natural disasters. Some systems may provide network access to remote locations or to locations with limited networking infrastructure via satellites or high altitude platforms. In the latter case, due to environmental conditions and other limitations, it is challenging to keep the platforms aloft and operational over a desired service area for long durations, such as weeks, months or more. For certain high altitude platforms, such as lighter-than-air craft, it can very difficult to orient the payload or other equipment in a particular direction, for instance so that solar panels maximize visibility with the sun, or so that telecommunications transceivers are positioned for effective communication with other high altitude platforms or ground-based equipment.

SUMMARY

Aspects of the technology relate to a high altitude platform (HAP) that is able to remain on station or move in a particular direction toward a desired location, for instance to provide telecommunication services. The high altitude platform may be a lighter-than-air (LTA) platform such as a balloon, dirigible/airship or other LTA platform configured to operate in the stratosphere. For instance, the LTA platform may include an envelope filled with lift gas and a payload for providing telecommunication services, with a connection member coupling the payload with the envelope. The envelope may be a superpressure envelope, with or without a ballonet that can be used to aid in altitude control. The payload may be configured to rotate relative to the envelope, such as to align solar panels with the sun or to improper telecommunications coverage in an area of interest. A lateral propulsion system may provide directional thrust for moving the LTA platform toward a destination or remaining on station over a location of interest (e.g., a city or regional service area). This can include a pointing mechanism that aligns a propeller assembly of the lateral propulsion system along a certain heading. By way of example, the propeller assembly may be able to rotate up to 360° or more around the connection member in order to adjust the balloon's heading.

The LTA platform may include a despin mechanism that adjusts for the relative rotation of the envelope with respect to the payload, for instance by torquing the payload against the envelope. The LTA platform may also include a motor control mechanism that adjusts for the rotation of the lateral propulsion assembly relative to the connection member. These mechanisms can operate independently under the control of one or more microcontrollers or other processing devices. Because these mechanisms act on different subsystems of the LTA platform, different rotational control methods may be employed for the respective mechanisms in order to account for variations in power and speed requirements of the subsystems.

According to one aspect of the technology, a method of operating a lighter-than-air high altitude platform (HAP) in the stratosphere is provided. The method comprises calculating, by one or more processors of the HAP, an offset to achieve a selected lateral propulsion target heading for a lateral propulsion assembly of the HAP; determining, by the one or more processors, whether to adjust the selected lateral propulsion target heading based on an accuracy threshold of the offset; and controlling rotation, by the one or more processors, of a stepper motor of the lateral propulsion assembly according to either the selected lateral propulsion target heading or the adjusted lateral propulsion target heading.

In one example, calculating the offset is based on a target heading for a despin mechanism of the HAP. Here, calculating the offset may be further based on a location of the lateral propulsion assembly relative to the despin mechanism and a payload of the HAP.

In another example, the method also includes adjusting the offset upon a determination that the lateral propulsion assembly would rotate through a hard stop structure.

In a further example, the method also includes, prior to controlling the rotation, spinning down a propeller of the lateral propulsion assembly when a rotation amount in accordance with the offset exceeds a gyroscopic force threshold of the HAP. In this case, the method may further include, upon determining that the selected lateral propulsion target heading is achieved according to controlling the rotation, resuming actuation of the propeller at a selected rate of rotation.

In another example, calculating the offset is based on a difference between a rotor position measured by an encoder and a position set by a stepper driver of the lateral propulsion assembly. The method in this case may also comprise performing a calibration routine of the stepper motor against the encoder. Performing the calibration routine may involve driving the stepper motor to a set of locations; at each location, injecting random noise into the stepper motor; and averaging a position read by an encoder of the lateral propulsion assembly at each location.

In a further example, controlling the rotation of the stepper motor is performed in accordance with a motor current limit.

In yet another example, the method further comprises performing a despin operation using a despin mechanism disposed between an envelope and a payload of the HAP. Here, the despin operation may be performed according to a voltage control mode, and controlling the rotation of the stepper motor is performed according to a current control mode. In this case, the method also includes: setting, in the voltage control mode, a voltage setpoint as a function of a mechanical load associated with the despin mechanism; and setting, in the current control mode, a current setpoint as a function of a mechanical load associated with the stepper motor.

In another example, controlling rotation of the stepper motor is further preformed based on a target heading of a directional communications module of the HAP.

According to another aspect of the technology, a lighter-than-air high altitude platform (HAP) is configured for operation in the stratosphere. The HAP comprising an envelope configured to hold lift gas and a connecting member operatively coupled at a first end thereof to the envelope. The connecting member has a connecting axis along a length thereof. The HAP also includes a payload coupled to a second end of the connecting member, and a lateral propulsion system rotatably engaged with the connecting member. The lateral propulsion system includes a propeller assembly having a propeller, and a control assembly operatively coupled to the propeller assembly and configured to rotate the propeller in a clockwise or counterclockwise direction about a propeller axis. The control assembly is being configured to rotate the lateral propulsion assembly along the connecting axis of the connecting member. The HAP further includes one or more processors configured to control operation of the lateral propulsion system. The one or more processors are configured to: calculate an offset to achieve a selected lateral propulsion target heading for the lateral propulsion system; determine whether to adjust the selected lateral propulsion target heading based on an accuracy threshold of the offset; and control rotation of a stepper motor of the control assembly according to either the selected lateral propulsion target heading or the adjusted lateral propulsion target heading.

In one example, calculation of the offset is based on a difference between a rotor position measured by an encoder of the lateral propulsion system and a position set by a stepper driver of the lateral propulsion system. In another example, rotation control of the stepper motor is further preformed based on a target heading of a directional communications module of the payload.

In a further example, the HAP also comprises a despin mechanism configured to adjust for a relative rotation of the envelope with respect to the payload. In this case, calculation of the offset may be based on a target heading for the despin mechanism. In addition, the one or more processors may be further configured to perform a despin operation using the despin mechanism. Here, the despin operation is performed according to a voltage control mode, and control of the rotation of the stepper motor is performed according to a current control mode.

BRIEF DESCRIPTION OF THE DRAWINGS

FIGS. 6A-C illustrate a control assembly in accordance with aspects of the technology.

DETAILED DESCRIPTION

Overview

The technology relates to despin and motor control architectures, such as for rotating elements of HAPs that are designed to operate, e.g., in the stratosphere. Stratospheric HAPs, such as LTA platforms, may have a float altitude of between about 50,000-120,000 feet above sea level. The ambient temperature may be on the order of −10° C. to −90° C. or colder, depending on the altitude and weather conditions. These and other environmental factors in the stratosphere can be challenging for lateral propulsion systems. The rotation control architectures discussed herein are designed to effectively operate in such conditions, although they may also be used in other environments with different types of systems besides LTA-type platforms.

As explained below, an example lateral propulsion system may employ a propeller arrangement to provide directional adjustments to the HAP, for instance to counteract movement due to the wind, or to otherwise cause the HAP to move along a selected heading. Such adjustments can enhance operation across a fleet of HAPs. For instance, by employing a small amount of lateral propulsion at particular times, a given platform may stay on station over a desired service area for a longer period, or change direction to move towards a particular destination. The platform may also be able to return to the desired service area more quickly using lateral propulsion to compensate against undesired wind effects. Applying this approach for some or all of the platforms in the fleet may mean that the total number of platforms required to provide a given level of service (e.g., telecommunications coverage for a service area) may be significantly reduced as compared to a fleet that does not employ lateral propulsion.

One or more motors can be used to actuate a lateral propulsion system of the HAP to affect the directional changes. This can include a pointing axis motor for rotating the lateral propulsion system to a particular heading, and a drive motor for causing a propeller assembly or other propulsion mechanism to turn on and off. In one example, a controller of the lateral propulsion system is configured to cause the pointing axis motor to rotate the propeller assembly about a connection member of the HAP by 360° or more. A rotational control mechanism may be part of the pointing axis motor arrangement. According to one aspect, the payload or other HAP element can contain multiple subassemblies, each with a rotational control system where the operation of one of them can directly affect the other. The rotational control systems then need to coordinate with each other to ensure each subassembly's pointing target is met.

EXAMPLE BALLOON SYSTEMS

Figure 1:
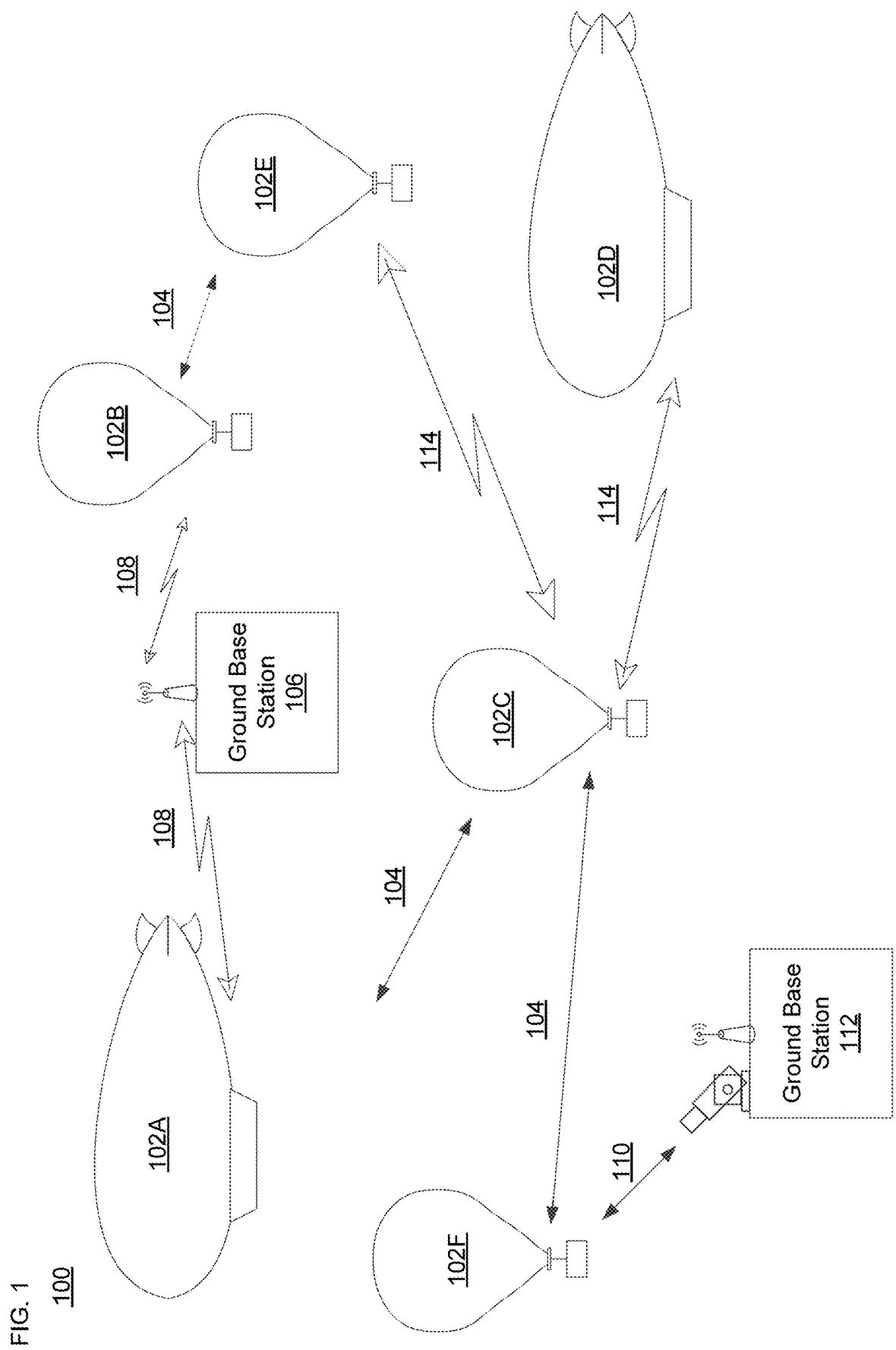
FIG. 1 is a functional diagram of an example system in accordance with aspects of the disclosure.

FIG. 1 depicts an example system 100 in which a fleet of high altitude platforms, such as LTA platforms, may be used. This example should not be considered as limiting the scope of the disclosure or usefulness of the features described herein. System 100 may be considered an LTA-based network. In this example, network 100 includes a plurality of devices, such as balloons or dirigibles 102A-F as well as ground-base stations 106 and 112. System 100 may also include a plurality of additional devices, such as various computing devices (not shown) as discussed in more detail below or other systems that may participate in the network.

The devices in system 100 are configured to communicate with one another. As an example, the HAPs may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for data communications. At least some of the HAPs may be configured for communications with ground-based stations 106 and 112 via respective links 108 and 110, which may be RF and/or optical links.

In one scenario, a given HAP 102 may be configured to transmit an optical signal via an optical link 104. Here, the given HAP 102 may use one or more high-power light-emitting diodes (LEDs) to transmit an optical signal. Alternatively, some or all of the HAP 102 may include laser systems for free-space optical communications over the optical links 104. Other types of free-space communication are possible. Further, in order to receive an optical signal from another HAP via an optical link 104, the HAP may include one or more optical receivers.

The HAPs may also utilize one or more of various RF air-interface protocols for communication with ground-based stations via respective communication links. For instance, some or all of the HAPs 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities.

In some examples, the links may not provide a desired link capacity for HAP-to-ground communications. For instance, increased capacity may be desirable to provide backhaul links from a ground-based gateway. Accordingly, an example network may also include downlink HAPs, which could provide a high-capacity air-ground link between the various HAPs of the network and the ground-base stations. For example, in network 100, dirigible 102A or balloon 102B may be configured as a downlink HAP that directly communicates with station 106.

Like other HAPs in network 100, downlink HAP 102F may be operable for communication (e.g., RF or optical) with one or more other HAPs via link(s) 104. Downlink HAP 102F may also be configured for free-space optical communication with ground-based station 112 via an optical link 110. Optical link 110 may therefore serve as a high-capacity link (as compared to an RF link 108) between the network 100 and the ground-based station 112. Downlink HAP 102F may additionally be operable for RF communication with ground-based stations 106. In other cases, downlink HAP 102F may only use an optical link for balloon-to-ground communications. Further, while the arrangement shown in FIG. 1 includes just one downlink HAP 102F, an example balloon network can also include multiple downlink HAPs. On the other hand, a HAP network can also be implemented without any downlink HAPs.

A downlink HAP may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of HAPs 102A-F could be configured to establish a communication link with space-based satellites and/or other types of non-LTA craft (e.g., drones, airplanes, etc.) in addition to, or as an alternative to, a ground based communication link. In some embodiments, a stratospheric HAP may communicate with a satellite or other high altitude platform via an optical or RF link. However, other types of communication arrangements are possible.

As noted above, the HAPs 102A-F may collectively function as a mesh network. More specifically, since HAPs 102A-F may communicate with one another using free-space optical links, the HAPs may collectively function as a free-space optical mesh network. In a mesh-network configuration, each HAP may function as a node of the mesh network, which is operable to receive data directed to it and to route data to other HAPs. As such, data may be routed from a source HAP to a destination HAP by determining an appropriate sequence of links between the source HAP and the destination HAP.

The network topology may change as the HAPs move relative to one another and/or relative to the ground. Accordingly, the network 100 may apply a mesh protocol to update the state of the network as the topology of the network changes. For example, to address the mobility of the HAPs 102A to 102F, the balloon network 100 may employ and/or adapt various techniques that are employed in mobile ad hoc networks (MANETs). Other examples are possible as well.

Network 100 may also implement station-keeping functions using winds and altitude control and/or lateral propulsion to help provide a desired network topology, particularly for LTA platforms. For example, station-keeping may involve some or all of HAPs 102A-F maintaining and/or moving into a certain position relative to one or more other HAPs in the network (and possibly in a certain position relative to a ground-based station or service area). As part of this process, each HAP may implement station-keeping functions to determine its desired positioning within the desired topology, and if necessary, to determine how to move to and/or maintain the desired position. Alternatively, the platforms may be moved without regard to the position of their neighbors, for instance to enhance or otherwise adjust communication coverage at a particular geographic location.

The desired topology may thus vary depending upon the particular implementation and whether or not the HAPs are continuously moving. In some cases, HAPs may implement station-keeping to provide a substantially uniform topology where the HAPs function to position themselves at substantially the same distance (or within a certain range of distances) from adjacent balloons in the network 100. Alternatively, the network 100 may have a non-uniform topology where HAPs are distributed more or less densely in certain areas, for various reasons. As an example, to help meet the higher bandwidth demands, HAPs may be clustered more densely over areas with greater demand (such as urban areas) and less densely over areas with lesser demand (such as over large bodies of water). In addition, the topology of an example HAP network may be adaptable allowing HAPs to adjust their respective positioning in accordance with a change in the desired topology of the network.

The HAPs of FIG. 1 may be platforms that are deployed in the stratosphere. As an example, in a high altitude network, the LTA platforms may generally be configured to operate at stratospheric altitudes, e.g., between 50,000 ft and 70,000 ft or more or less, in order to limit the HAPs' exposure to high winds and interference with commercial airplane flights. In order for the HAPs to provide a reliable mesh network in the stratosphere, where winds may affect the locations of the various HAPs in an asymmetrical manner, the HAPs may be configured to move latitudinally and/or longitudinally relative to one another by adjusting their respective altitudes, such that the wind carries the respective HAPs to the respectively desired locations. Lateral propulsion may also be employed to affect the balloon's path of travel.

Figure 2A:
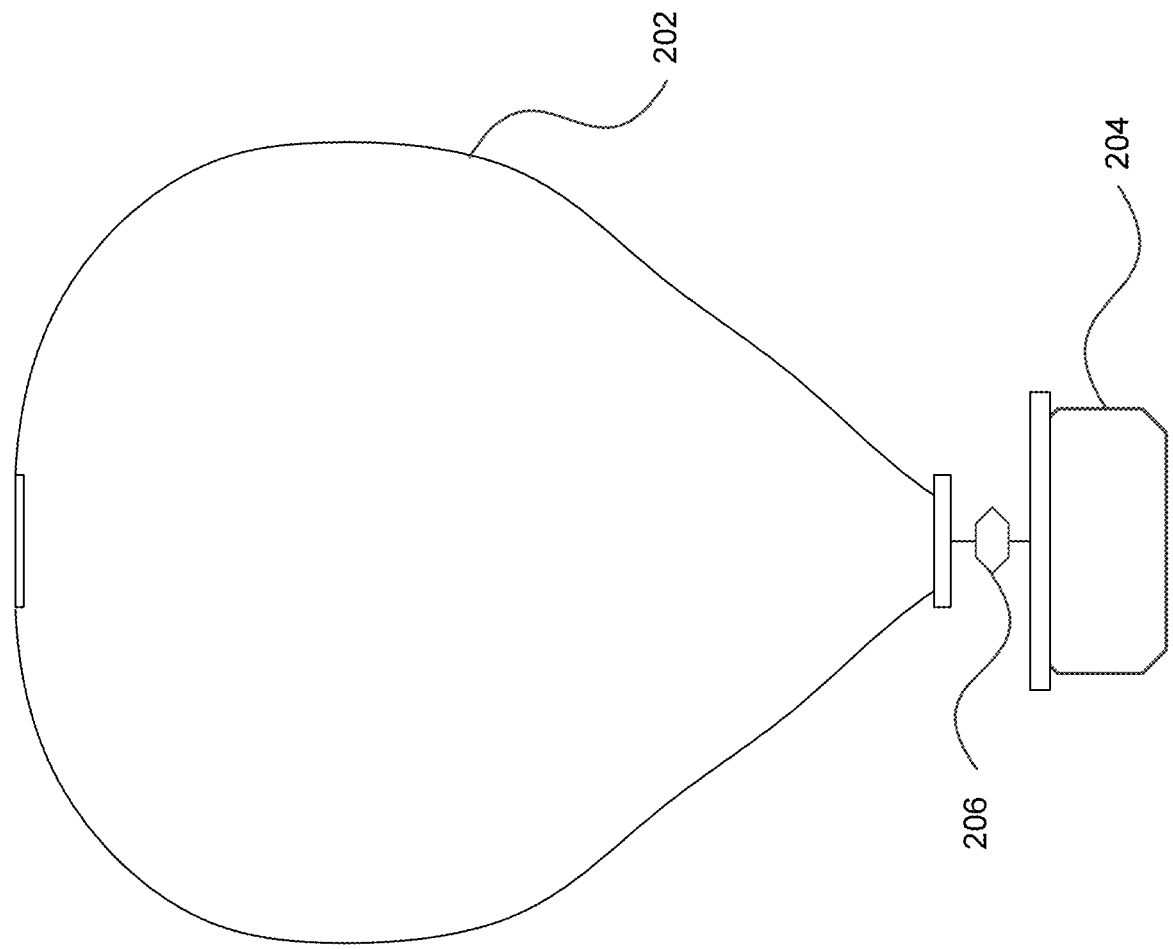
FIGS. 2A-B illustrates lighter-than-air platform configurations in accordance with aspects of the disclosure.
Figure 2B:
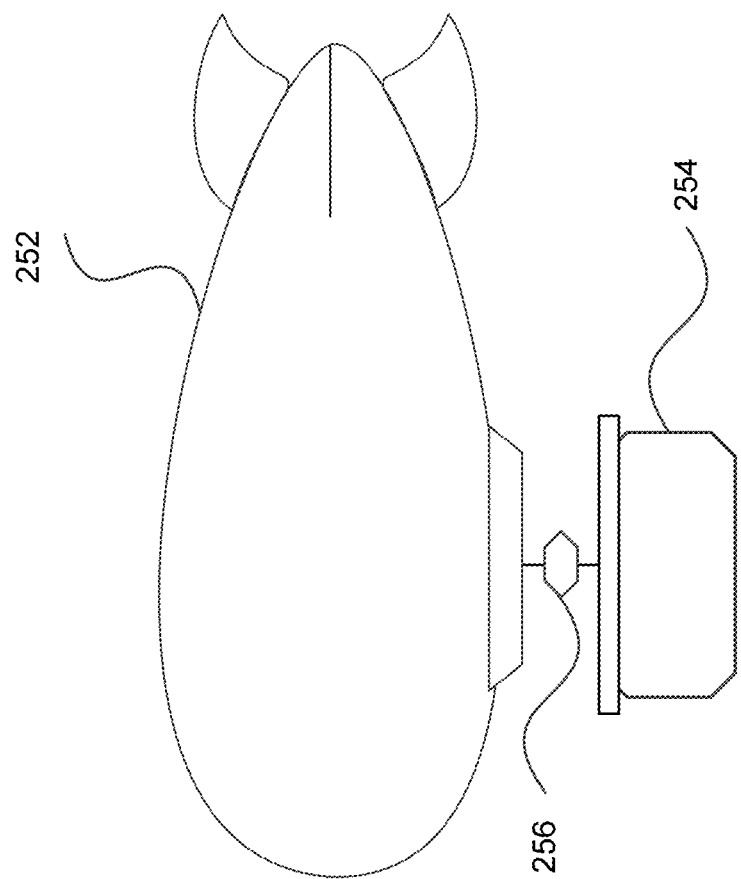

In an example configuration, the HAPs include an envelope and a payload, along with various other components. FIG. 2A is an example of a high-altitude balloon 200, which may represent any of the balloons of FIG. 1. As shown, the example balloon 200 includes an envelope 202, a payload 204 and a termination (e.g., cut-down & parachute) device 206. FIG. 2B is an example of a high-altitude airship 250, which may represent any of the dirigibles of FIG. 1. As shown, the example airship 250 includes an envelope 252, a payload 254 and a termination (e.g., cut-down & parachute) device 256.

The envelope 202 or 252 may take various shapes and forms. For instance, the envelope may be made of materials such as polyethylene, mylar, FEP, rubber, latex, fabrics or other thin film materials or composite laminates of those materials with fiber reinforcements embedded inside or outside. Other materials or combinations thereof or laminations may also be employed to deliver required strength, gas barrier, RF and thermal properties. Furthermore, the shape and size of the envelope may vary depending upon the particular implementation. Additionally, the envelope may be filled with different types of gases, such as air, helium and/or hydrogen. Other types of gases, and combinations thereof, are possible as well. Shapes may include typical balloon shapes like spheres and "pumpkins", or aerodynamic shapes that are symmetric (e.g., teardrop-shaped), provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Figure 3:
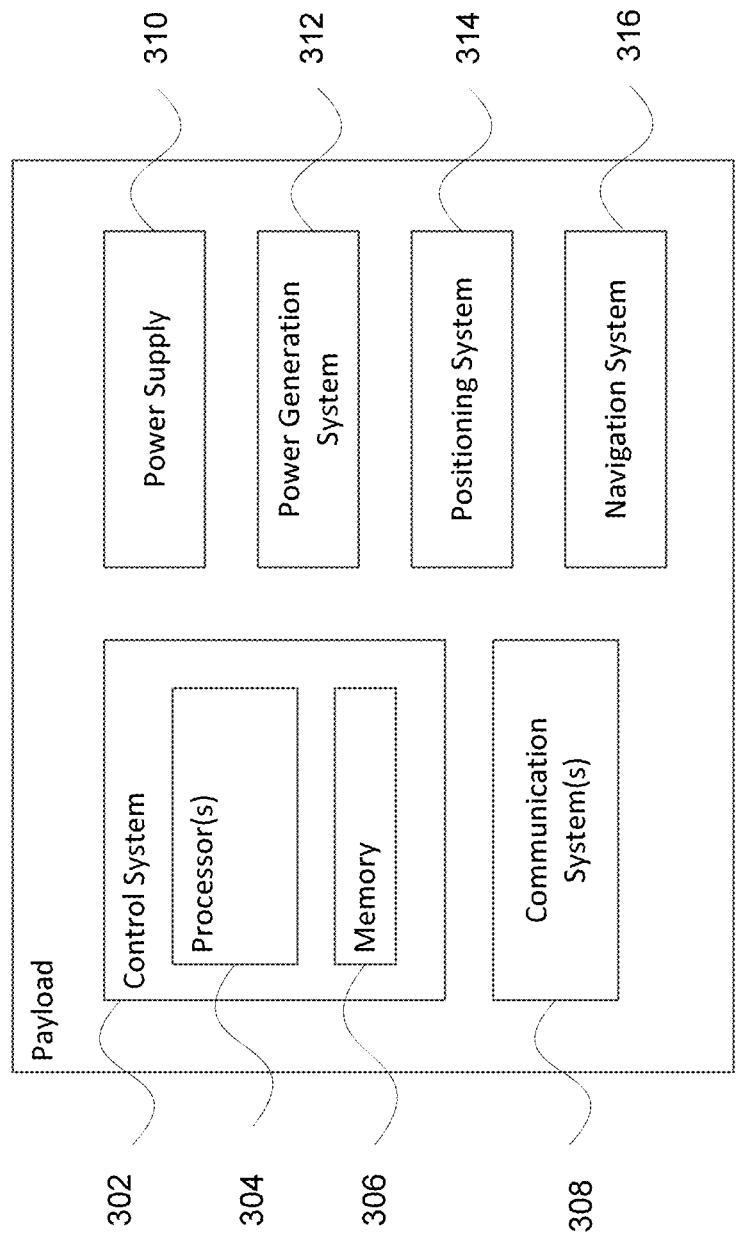
FIG. 3 is an example payload arrangement in accordance with aspects of the disclosure.

According to one example shown in FIG. 3, a payload 300 of a HAP platform includes a control system 302 having one or more processors 304 and on-board data storage in the form of memory 306. Memory 306 stores information accessible by the processor(s) 304, including instructions that can be executed by the processors. The memory 306 also includes data that can be retrieved, manipulated or stored by the processor. The memory can be of any non-transitory type capable of storing information accessible by the processor, such as a hard-drive, memory card, ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 304 in accordance with the instructions.

The one or more processors 304 can include any conventional processors, such as a commercially available CPU. Alternatively, each processor can be a dedicated component such as an ASIC, controller, or other hardware-based processor. Although FIG. 3 functionally illustrates the processor(s) 304, memory 306, and other elements of control system 302 as being within the same block, the system can actually comprise multiple processors, computers, computing devices, and/or memories that may or may not be stored within the same physical housing. For example, the memory can be a hard drive or other storage media located in a housing different from that of control system 302. Accordingly, references to a processor, computer, computing device, or memory will be understood to include references to a collection of processors, computers, computing devices, or memories that may or may not operate in parallel.

The payload 300 may also include various other types of equipment and systems to provide a number of different functions. For example, as shown the payload 300 includes one or more communication systems 308, which may transmit signals via RF and/or optical links as discussed above. The communication system(s) 308 include communication components such as one or more transmitters and receivers (or transceivers), one or more antennae, and a baseband processing subsystem. (not shown). In one scenario, a given communication module of the communication system operates in a directional manner. For instance, one or more high gain directional antennas may be mechanically or functionally pointed (e.g., via beamforming) in a selected direction(s) to enable uplink and/or downlink connectivity with other communications devices (e.g., other LTA platforms, ground stations or personal communication devices). In this case, it may be particularly beneficial to ensure that the given communication module is pointed at a target heading to ensure the communication link(s) (e.g., according to a determined communication bit error rate, signal-to-noise ratio, etc.).

The payload 300 is illustrated as also including a power supply 310 to supply power to the various components of the balloon. The power supply 310 could include one or more rechargeable batteries or other energy storage systems like capacitors or regenerative fuel cells. In addition, the balloon 300 may include a power generation system 312 in addition to or as part of the power supply. The power generation system 312 may include solar panels, stored energy (hot air), relative wind power generation, or differential atmospheric charging (not shown), or any combination thereof, and could be used to generate power that charges and/or is distributed by the power supply 310.

The payload 300 may additionally include a positioning system 314. The positioning system 314 could include, for example, a global positioning system (GPS), an inertial navigation system, and/or a star-tracking system. The positioning system 314 may additionally or alternatively include various motion sensors (e.g., accelerometers, magnetometers, gyroscopes, and/or compasses). The positioning system 314 may additionally or alternatively include one or more video and/or still cameras, and/or various sensors for capturing environmental data. Some or all of the components and systems within payload 300 may be implemented in a radiosonde or other probe, which may be operable to measure, e.g., pressure, altitude, geographical position (latitude and longitude), temperature, relative humidity, and/or wind speed and/or wind direction, among other information. Wind sensors may include different types of components like pitot tubes, hot wire or ultrasonic anemometers or similar, windmill or other aerodynamic pressure sensors, laser/lidar, or other methods of measuring relative velocities or distant winds.

Payload 300 may include a navigation system 316 separate from, or partially or fully incorporated into control system 302. The navigation system 316 may implement station-keeping functions to maintain position within and/or move to a position in accordance with a desired topology or other service requirement. In particular, the navigation system 316 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral positioning system that is separate from the payload. Alternatively, the altitudinal and/or lateral adjustments may be computed by a central control location and transmitted by a ground based, air based, or satellite based system and communicated to the HAP. In other embodiments, specific HAPs may be configured to compute altitudinal and/or lateral adjustments for other HAPs and transmit the adjustment commands to those other HAPs.

Figure 4A:
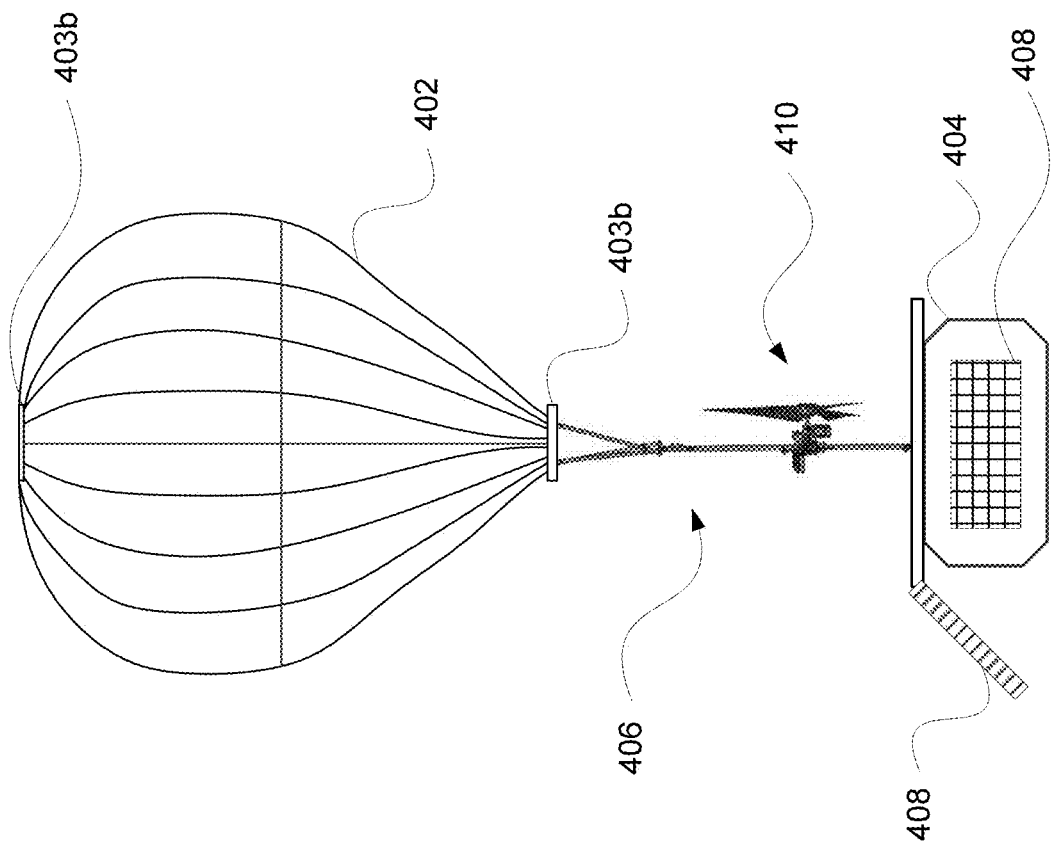
FIGS. 4A-C illustrate an example of a balloon platform with lateral propulsion and a despin mechanism in accordance with aspects of the disclosure.

In order to affect lateral positions or velocities, the platform includes a lateral propulsion system. FIG. 4A illustrates one example configuration 400 of a balloon-type HAP with propeller-based lateral propulsion, which may represent any of the balloons of FIG. 1. As shown, the example 400 includes an envelope 402 with a top cap 403a and a base cap 403b, a payload 404 and a down connect member 406 configured to couple the envelope 402 (via base cap 403b) and the payload 404 together. Cables or other wiring between the payload 404 and the envelope 402 may be run within or along the down connect member 406. One or more solar panel assemblies 408 may be coupled to the payload 404 or another part of the balloon platform. The payload 404 and the solar panel assemblies 408 may be configured to rotate about the down connect member 406 (e.g., up to 360° rotation or more), for instance to align the solar panel assemblies 408 with the sun to maximize power generation. The envelope 402 may rotate freely with respect to the payload 404. Example 400 also illustrates a lateral propulsion system 410 using, for instance, one or more propeller assemblies. While this example of the lateral propulsion system 410 is one possibility, the location could also be fore and/or aft of the payload section 404, or fore and/or aft of the envelope section 402, or any other location that provides the desired thrust vector. Details of the lateral propulsion system 410 are discussed below.

Figure 4B:
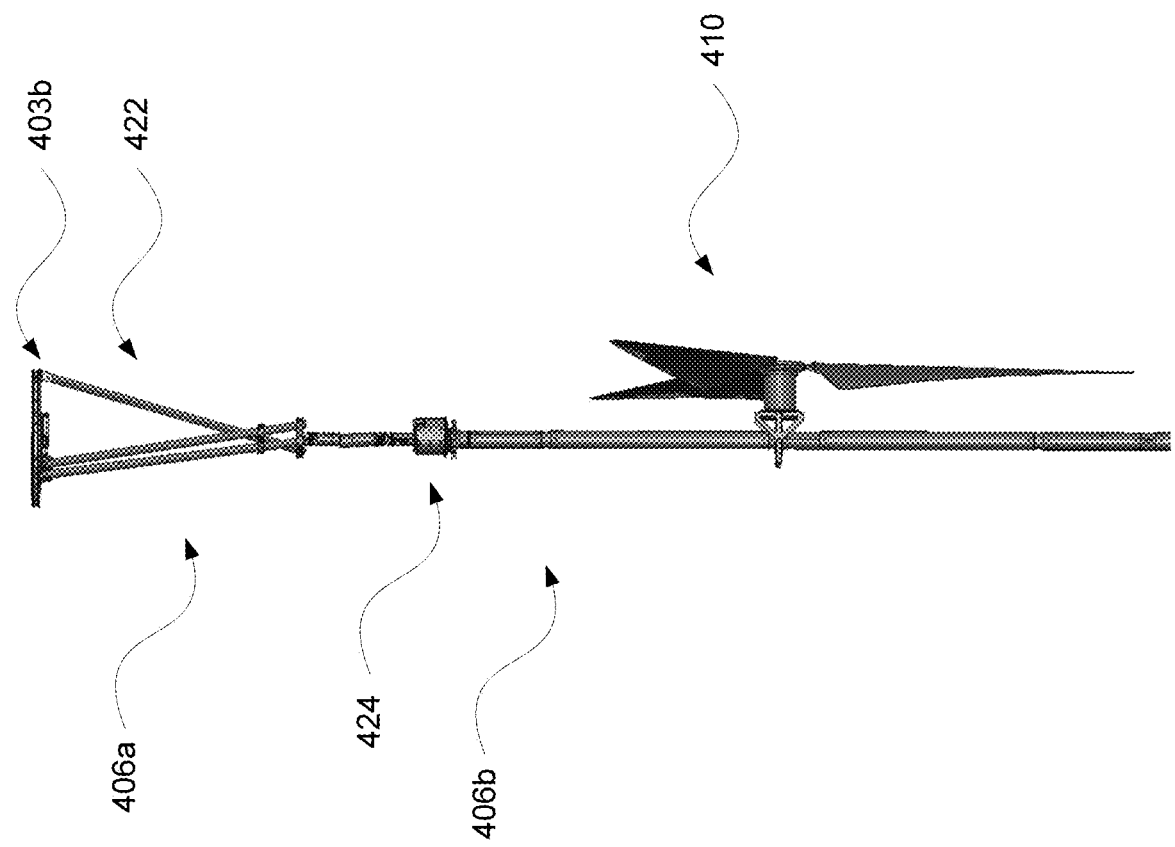
Figure 4C:
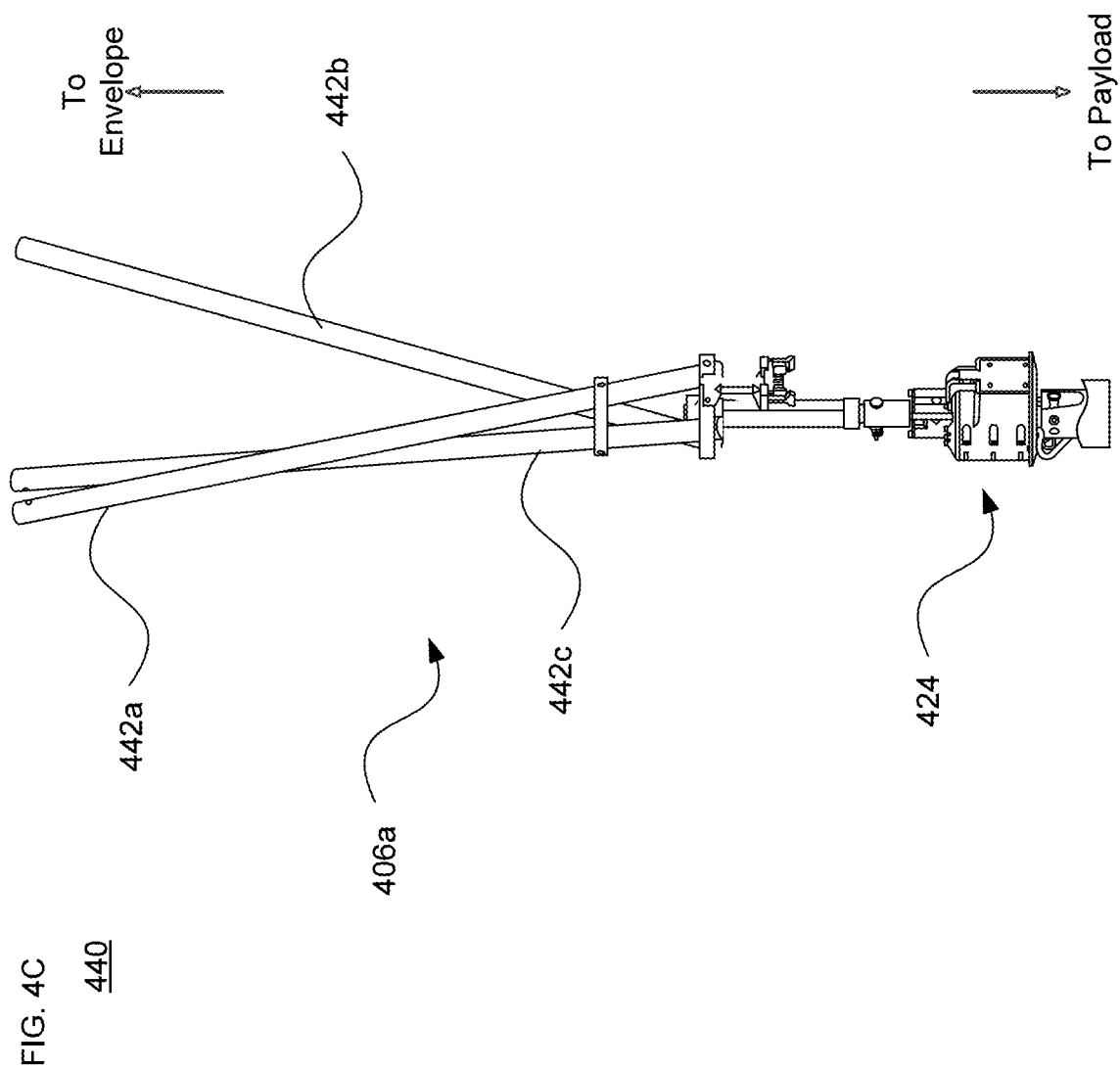

FIG. 4B illustrates a view 420 showing down-connect member 406 and lateral propulsion system 410. As shown in view 420 of FIG. 4B and the enlarged view 440 of FIG. 4C, upper portion 406a of the down connect member 406 may include a set of spars 422 coupled to the base cap 403b. The set of spars 422 may have a tripod configuration 442a-442c as illustrated in FIG. 4C. Disposed along portion 406b of the down connect member is a despin mechanism 424, which is configured to adjust for the relative rotations of the envelope and the payload by torquing (e.g., rotating) the payload against the envelope. In this example, despin mechanism 424 is disposed above the lateral propulsion system (i.e., between the lateral propulsion system and the base cap of the envelope). In other configurations the despin mechanism 424 may be disposed below the lateral propulsion system (i.e., between the lateral propulsion system and the payload). The despin mechanism 424 may be controlled by a processor of control system 302. In one example, one or more communication systems 308 or sensing systems on the payload may be directional or require a rotationally stable platform. In these situations, the despin system can be employed to achieve the necessary directional control or stabilization.

EXAMPLE CONFIGURATIONS

Figure 5B:
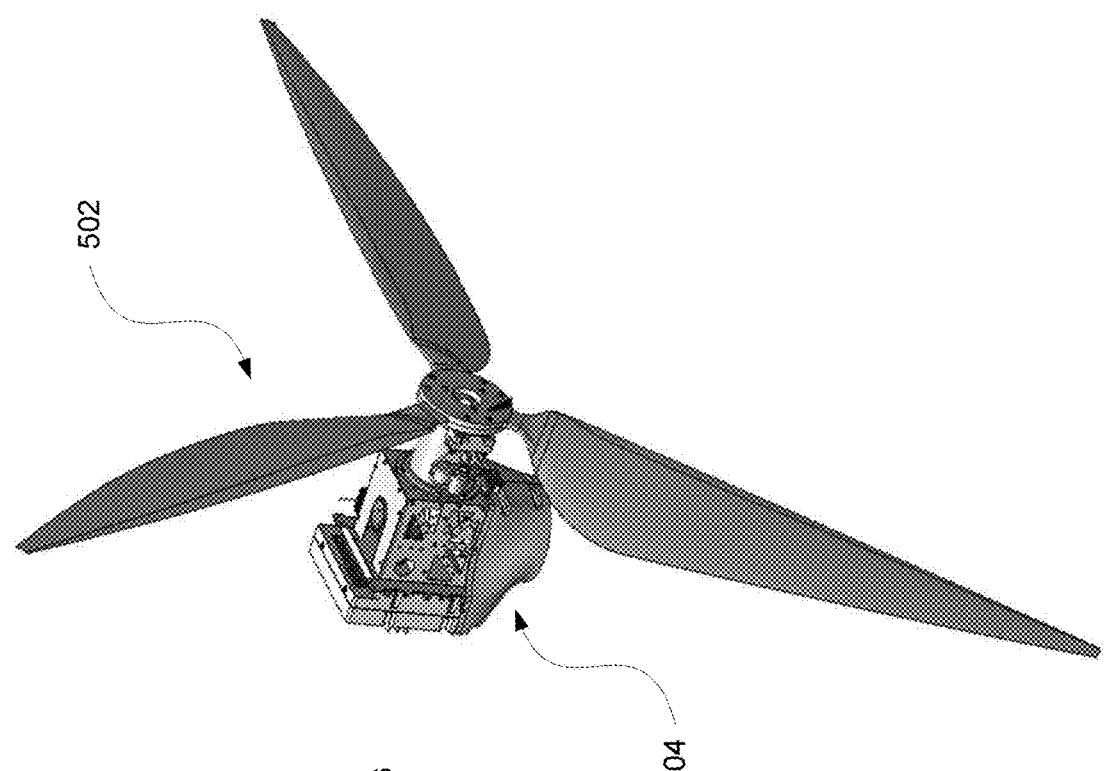
FIGS. 5A-B illustrate an example lateral propulsion system according to aspects of the technology.
Figure 5A:
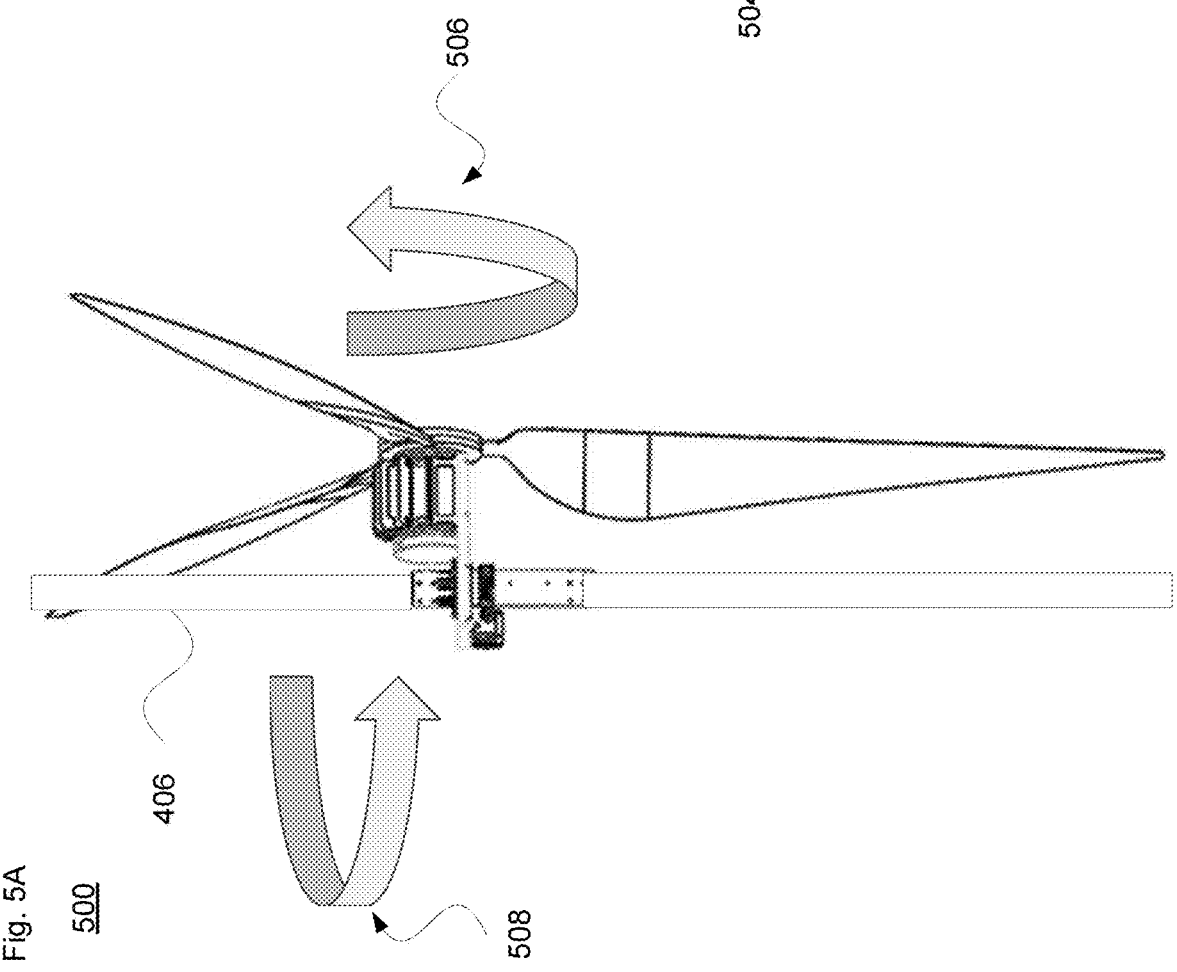

FIG. 5A illustrates an example 500 of the lateral propulsion system 410 of FIG. 4. Example 500 includes a propeller assembly 502 affixed to a control assembly 504, as shown in FIG. 5B. The control assembly 504 is configured to manage operation of the propeller assembly 502, including setting its pointing direction, speed of rotation and determining when to turn on the propeller and for how long. The propeller of the propeller assembly 502 may be arranged generally parallel to the down connect member 406, and is able to rotate in either a clockwise or counterclockwise direction as shown by arrow 506. The control assembly 504 is rotatable about a longitudinal axis of the down connect member 406 (e.g., up to or more than 360° rotation) as shown by arrow 508, changing the pointing direction of the propeller assembly 502 in order to change the heading of the LTA platform.

While this configuration or other similar configurations gives the lateral propulsion system 410 two degrees of operational freedom, additional degrees of freedom are possible with other pointing mechanisms or air-ducting mechanisms. This flexible thrusting approach may be used to help counteract continually changing wind effects. Rotation of the control assembly 504 and propeller assembly 502 about the down connect member 406 is desirably independent of rotation of the solar panel assemblies (and/or payload) about the down connect member 406. Furthermore, such rotation is also independent of operation of the despin mechanism 424 that may be used to adjust the relative rotation of the envelope and the payload.

Figure 6A:
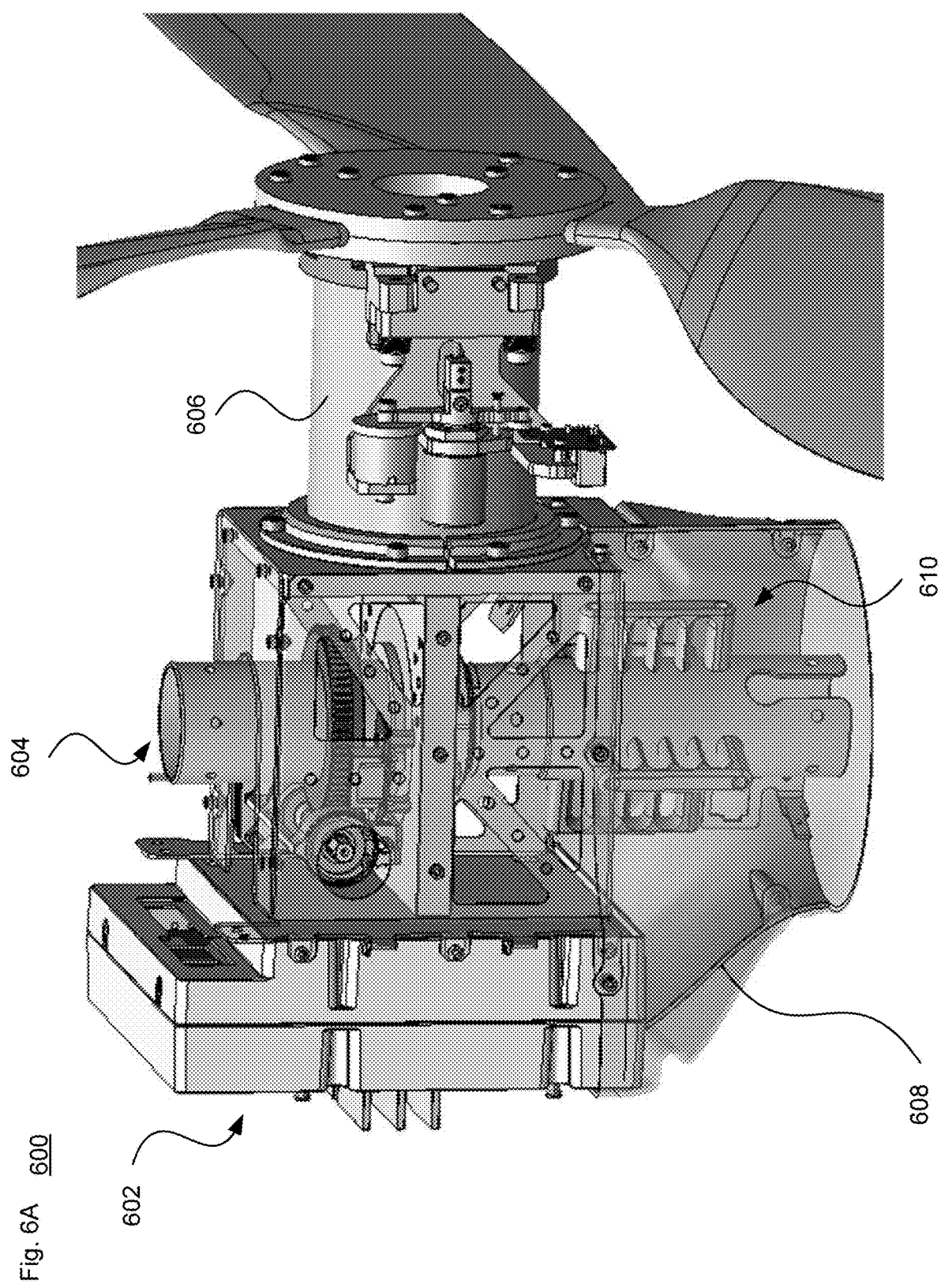

FIGS. 6A-C provides enlarged views 600, 620 and 640, respectively, of the control assembly 504. The control assembly may include an electronics module 602 for controlling operation of the assembly, a coupling section 604 that may be part of or otherwise connected to the down connect member, and a propeller motor assembly 606. As shown, an outer cover or shroud 608 may encompass a cable management structure 610, which is part of or secured to the coupling section 606. Power and data cables can be run through the cable management structure 610, for example connecting the electronics module 602 and other components of the lateral propulsion system to a power supply and/or control system of the payload. The cable management structure 610 is configured for power and/or data cables to be placed in a helical arrangement, with the ability to flex over a wide rotation range of the control assembly and propeller assembly, e.g., up to 360°-400° or more, while providing data/power to the lateral control system.

The payload or the lateral propulsion system (or both) may have on-board sensors (e.g., differential GPS or DGPS) to provide accurate attitude and/or position and velocity measurements, enabling highly accurate pointing of the propeller in an absolute direction as well as relative to the payload direction. These sensors are also able to provide measurement of the balloon platform's lateral speed. The propeller motor assembly 606 is configured to rotate the propeller in a clockwise or counterclockwise direction, with or without additional gearing. The propeller motor assembly 606 may be brushless, which can generate more torque than a brush-type motor. By way of example, the brushless motor may be a 300 W-1000 W motor, which is capable of rotating the propeller between 900-2500 rpm or more. The motor may employ a cooling system, for instance using cooling fins or air ducts (not shown) to remove excess heat from the motor or electronics. The system may only need to drive the propeller to achieve a balloon lateral speed of between 1-15 m/s relative to the ground in order to significantly increase the ability of the balloon to stay on or return to station. The speed may be dependent on the location of interest, wind currents at a particular location or altitude, season/time of year, time of day, and/or other factors.

As shown in FIG. 6B, there may be a pointing axis motor assembly 622 in addition to propeller motor assembly 606. The pointing motor assembly 606 is configured to cause the control assembly and propeller assembly to rotate about the down connect member. This may be done by actuating a worm gear mechanism 624. For instance, the pointing motor assembly 606 may include a stepper or brushless DC motor that drives the worm gear mechanism 624, which enables the assembly to rotate about the down connect member by up to 360°-400° or more. Rotation and pointing of the propeller unit could be accomplished with many different configurations of motors and gears or other mechanisms. Also shown in this figure is a braking mechanism 626, which can be used to stop rotation of the propeller.

Figure 6D:
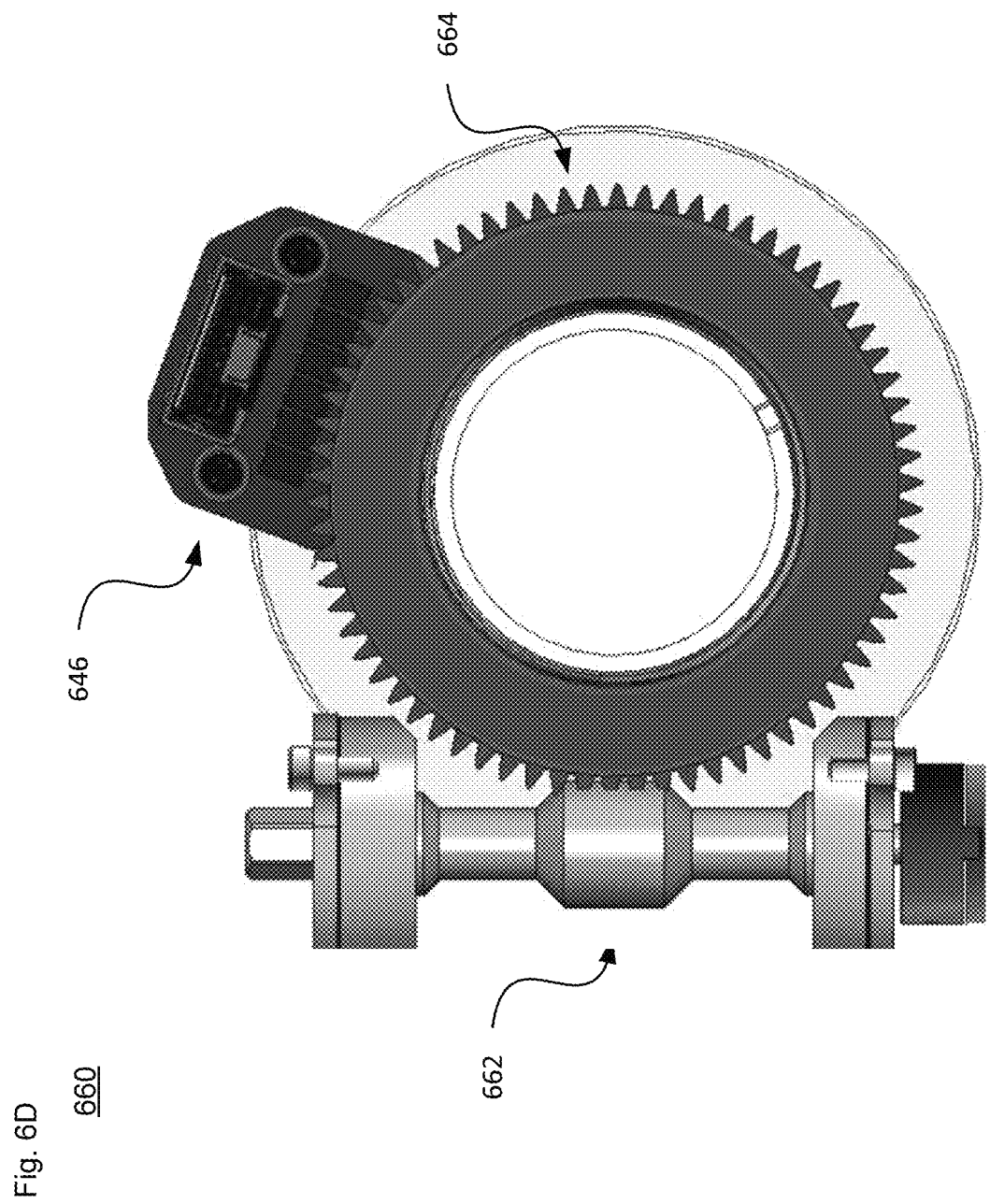
FIGS. 6D-E illustrate an exemplary worm gear mechanism in accordance with aspects of the technology.
Figure 6E:
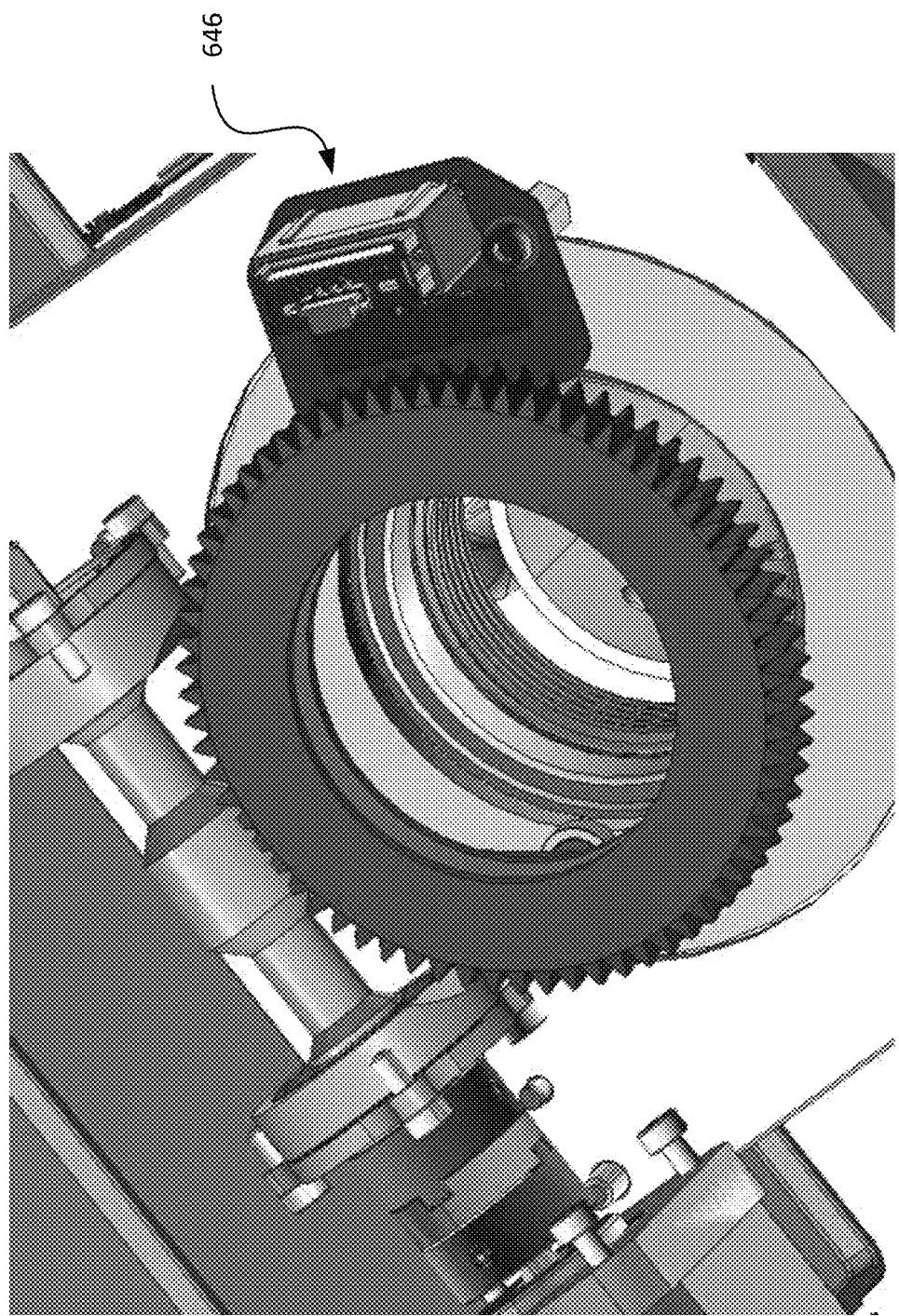

As shown in FIG. 6C, the electronics module 602 may include a control subsystem 642 and a power subsystem 644. A position sensor module 646 may be part of the position motor assembly 606, to determine a relative alignment of the propeller assembly relative to the down connect member, payload or other point of reference. Adjacent to the propeller motor assembly 606 is the braking mechanism 626, which may include a brake unit 648, a brake sensor 650, a holding magnet 652 and an actuator such as solenoid 654. FIGS. 6D and 6E illustrate top and perspective views 660 and 680, respectively, that show an example of worm gear mechanism 624. As illustrated, worm gear shaft 662 engages gear 664, which attaches to coupling section 604 (see FIG. 6A) that connects to the down connect member. Position sensor module 646 may include one or more position sensors, such as a Hall Effect sensor.

Figure 7:
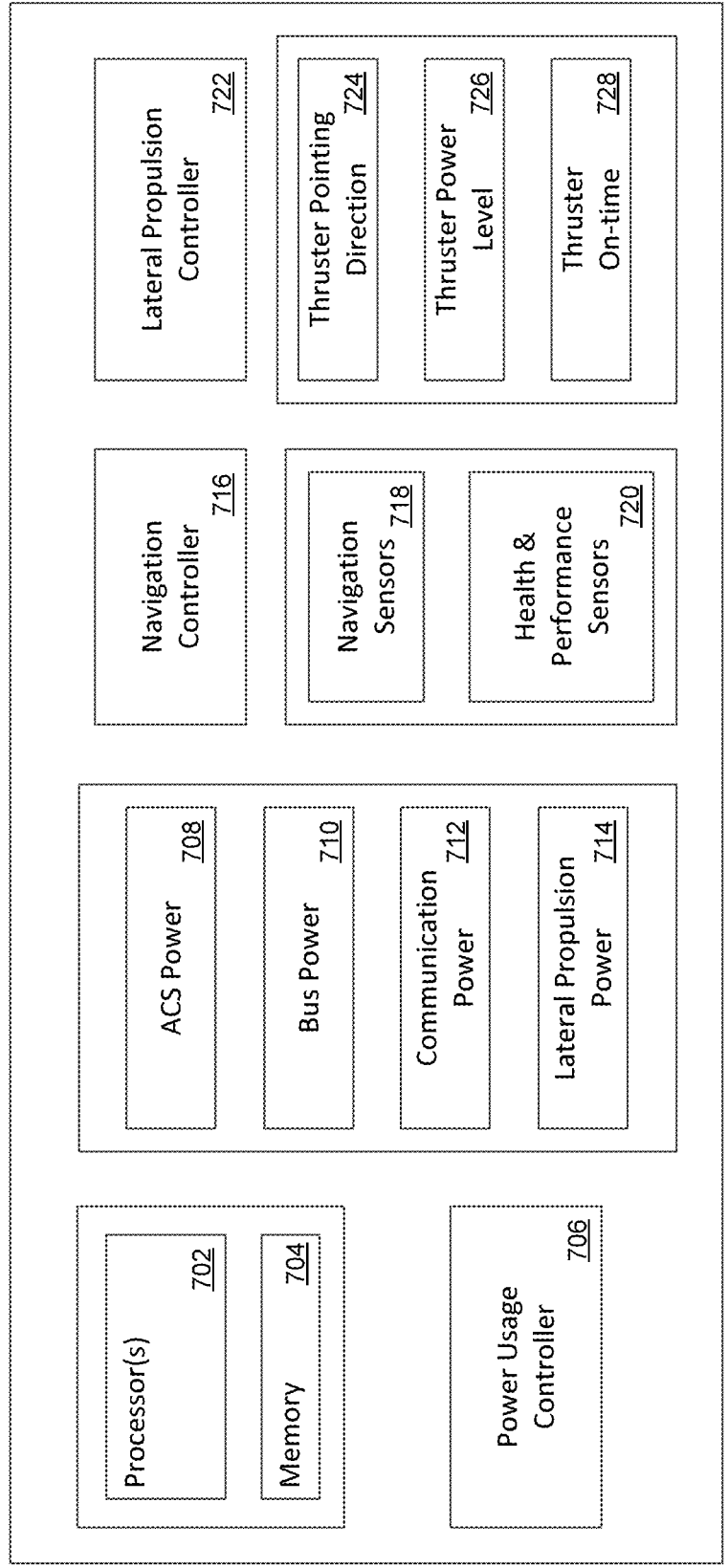
FIG. 7 is a block diagram of an example electronics module in accordance with aspects of the disclosure.

A block diagram of an exemplary electronics module 700 is illustrated in FIG. 7. The electronics module may be part of or separate from the navigation system 316 or the control system 302 of the payload. As shown, a CPU, controller or other types of processor(s) 702, as well as memory 704, may be employed within the electronics module 700 to manage aspects of the lateral propulsion system. The operation of despin mechanism 424 may also be controlled by the processor(s) 702. A power usage controller 706 may be employed to manage various power subsystems of the electronics module, including for altitude control system (ACS) power 708 (e.g. to control buoyancy of the envelope), bus power 710, communication power 712 and lateral propulsion power 714. The power usage controller 706 may be separate from or part of the processor(s) 702.

The control subsystem may include a navigation controller 716 that is configured to employ data obtained from onboard navigation sensors 718, including an inertial measurement unit (IMU) and/or differential GPS, received data (e.g., weather information), and/or other sensors such as health and performance sensors 720 (e.g., a force torque sensor) to manage operation of the balloon's systems. The navigation controller 716 may be separate from or part of the processor(s) 702. The navigation controller works with system software, ground controller commands, and health & safety objectives of the system (e.g., battery power, temperature management, electrical activity, etc.) and helps decide courses of action. The decisions based on the sensors and software may be to save power, improve system safety (e.g., increase heater power to avoid systems from getting too cold during stratospheric operation) or divert power to altitude controls or divert power to lateral propulsion systems.

When decisions are made to activate the lateral propulsion system, the navigation controller then leverages sensors for position, wind direction, altitude and power availability to properly point the propeller and to provide a specific thrust condition for a specific duration or until a specific condition is reached (a specific velocity or position is reached, while monitoring and reporting overall system health, temperature, vibration, and other performance parameters). In this way, the navigation controller can continually optimize the use of the lateral propulsion systems for performance, safety and system health. Upon termination of a flight, the navigation controller can engage the safety systems (for example the propeller braking mechanism) to prepare the system to descend, land, and be recovered safely.

Lateral propulsion controller 722 is configured to continuously control the propeller's pointing direction (e.g., via worm gear mechanism 624), manage speed of rotation, power levels, and determine when to turn on the propeller or off, and for how long. The lateral propulsion controller 722 thus oversees thruster pointing direction 724, thruster power level 726 and thruster on-time 728 modules. The lateral propulsion controller 722 may be separate from or part of the processor(s) 702. Processor software or received human controller decisions may set priorities on what power is available for lateral propulsion functions (e.g., using lateral propulsion power 714). The navigation controller then decides how much of that power to apply to the lateral propulsion motors and when (e.g., using thruster power level 726). In this way, power optimizations occur at the overall system level as well as at the lateral propulsion subsystem level. This optimization may occur in a datacenter on the ground or locally onboard the balloon platform.

The lateral propulsion controller 722 is able to control the drive motor of the propeller motor assembly so that the propeller assembly may operate in different modes. Two example operational modes are: constant power control or constant rotational velocity control. The electronics module may store data for both modes and the processor(s) of the control assembly may manage operation of the drive motor in accordance with such data. For instance, the processor(s) may use the stored data to calculate or control the amount of power or the rotational propeller velocity needed to achieve a given lateral speed. The electronics module may store data for the operational modes and the processor(s) of the control assembly may manage operation of the drive motor in accordance with such data. For instance, the processor(s) may use the stored data to calculate the amount of current needed to achieve a given lateral speed. The processor(s) may also correlate the amount of torque required to yield a particular speed in view of the altitude of the balloon platform.

The processor(s) may control the drive motor continuously for a certain period of time, or may cycle the drive motor on and off for selected periods of time. This latter approach may be done for thermal regulation of the drive motor. For instance, the propeller may be actuated for anywhere from 1 second to 5 minutes (or more), and then turned off to allow for motor cooling. This may be dependent on the thermal mass available to dissipate heat from the motor.

As noted above, the lateral propulsion controller 722 regulates the thruster pointing direction 724, such as by causing the pointing motor assembly to drive the worm gear mechanism in a first direction to rotate clockwise about the down connect longitudinal axis or in a second direction to rotate counterclockwise about the longitudinal axis.

Figure 8:
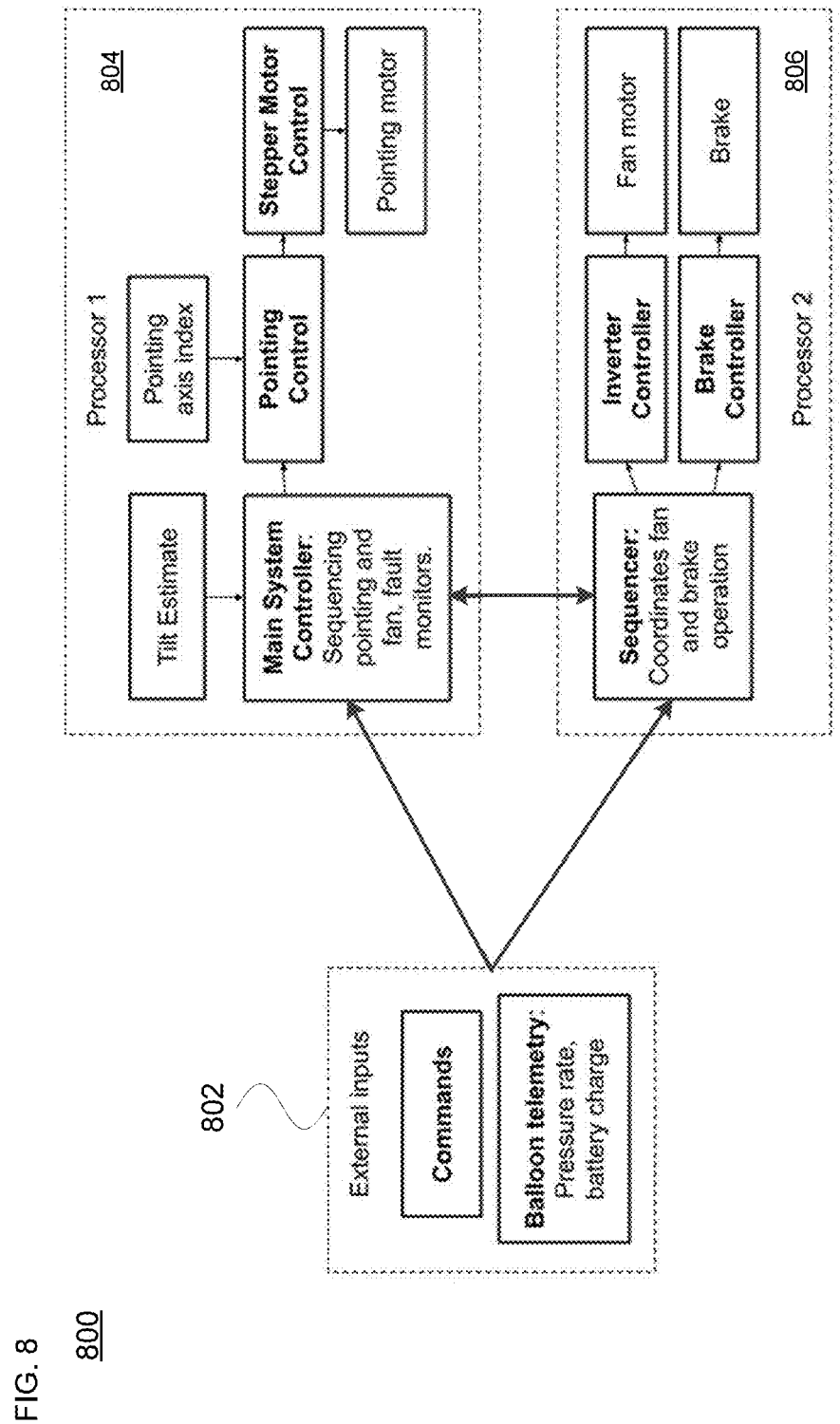
FIG. 8 illustrates an exemplary lateral propulsion controller arrangement in accordance with aspects of the technology.

FIG. 8 illustrates a view 800 of an exemplary functional implementation of the lateral propulsion controller. In this example, external inputs 802, such as control commands and/or LTA vehicle telemetry information (e.g., pressure rate, battery charge, etc.) are received and provided to one or more processors of the electronics module. For instance, a first processor 804 may control operation of the pointing axis motor assembly and a second processor 806 may control operation of the propeller motor assembly. Here, by way of example, tilt estimate information may be provided to a main system controller or control module that evaluates the estimated tilt information and other data (e.g., fault monitors, sequencing and pointing information, etc.), and provides that information to a pointing control module. The pointing control module also receives a pointing axis index, which can indicate the pointing position of the propeller relative to the down connect member or other point of reference, how many degrees of rotation the propeller has moved relative to a default position, etc. In this example, such information is used by a stepper motor control module to control operation of the pointing axis motor assembly, for instance by causing it to rotate in a clockwise (or counter-clockwise) direction once a threshold rotation amount has been exceeded (e.g., 320°) or a maximum rotation amount has been reached (e.g., 360° or 400°).

Figure 9A:
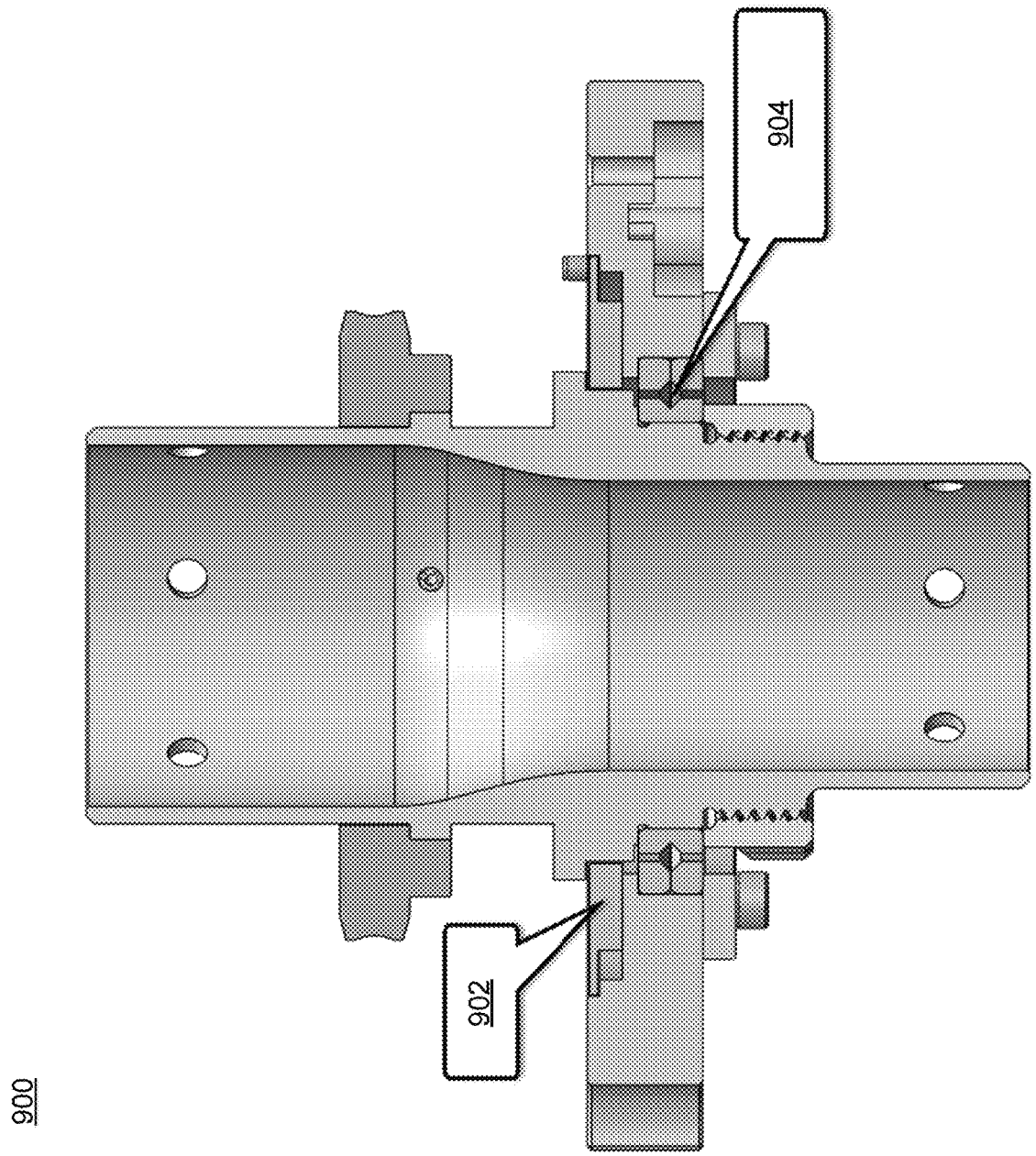
FIGS. 9A-B illustrate a hard stop structure in accordance with aspects of the disclosure.
Figure 9B:
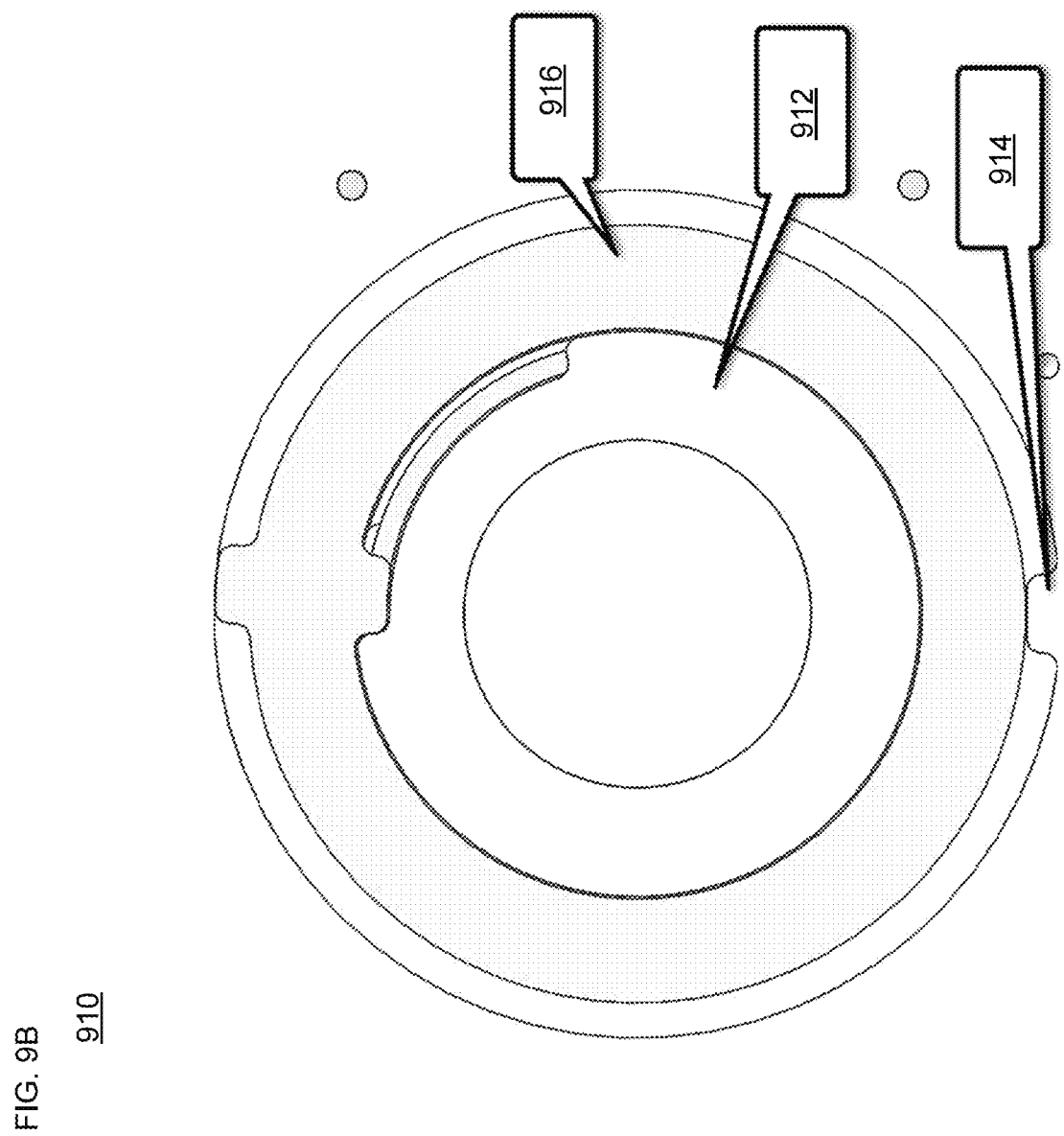

For example, FIG. 9A illustrates a cross-sectional view 900 of the coupling section and FIG. 9B illustrates a top-down view 910 of the coupling section, which illustrates one example of a hard stop structure to prevent further rotation of the propeller assembly once the maximum rotation amount has been reached. As shown in FIG. 9A, the coupling section may include a hard stop ring member 902 and a cross roller bearing 904. The top-down view illustrates a shaft 912 of the coupling section, an outer housing 914, and a stopping element 916 disposed between the shaft 912 and outer housing 914. This arrangement may be employed, for instance to limit movement of power and data cables during operation of the lateral propulsion system.

EXAMPLE OPERATION

As discussed above, the lateral propulsion controller may be configured to control the propeller's pointing direction via the worm gear mechanism. This controller or another processor of the electronics module or the control system of the payload may also manage operation of the despin mechanism, which addresses relative rotation between the envelope and payload.

In one configuration, the controller(s) employs a stepper motor driver operatively coupled to a stepper motor having a rotary encoder disposed on the stepper motor shaft. For instance, the stepper motor driver may be an actuator that is able to convert a pulse signal into angular displacement signal, and actuate the stepper motor accordingly. Using the encoder, the controller is able to measure the load on the stepper motor and increase or reduce the power sent to the motor accordingly, which can substantially reduce power consumption.

By way of example, on the despin system (e.g., despin mechanism 424), power consumption may be reduced from 8 W on average to 1.5 W, or by at least 80%. While a brushless DC motor may be employed for despin, using a stepper motor allows for better operational control if the encoder fails, since a stepper motor is designed for low speed no-feedback usage (e.g., open loop operation).

The controller works by monitoring the difference between the rotor position as measured by the encoder and the position set by the stepper driver. The stepper driver's set position can be determined by either directly querying the drive on its position (if available) or by counting the step pulses sent to the drive. In an ideal situation these two positions will be identical, but due to a load on the motor the two positions may differ.

When the difference between the stepper driver position and rotor position is large, it indicates a high load on the stepper motor. In response, power to the motor is increased, which reduces the position difference. Accordingly, if the difference between the stepper driver position and rotor position is too small, the load on the stepper motor is low, and power to the motor is reduced to increase the difference and save power.

Maintaining a set difference between the stepper driver position and rotor position improves efficiency not only by adapting the motor power to match the load, but also due to the fact that motors most efficiently convert electricity to motion when the rotor position lags behind the driver position by a specific amount. It is a similar approach to field-oriented control for three phase brushless DC motors, but adapted for low speed, stepper motors, and existing stepper drivers, which can reduce hardware development time.

However, this approach requires high encoder accuracy and can be disrupted by manufacturing and assembly variation. By way of example, a positional error of at most 0.3 degrees may be needed for the stepper motor. The required accuracy is a function of the steps per revolution of the stepper motor. Thus, according to one aspect of the technology, a calibration routine may be employed to compensate for the error. The calibration routine drives the motor to several locations along its rotation. At each location, random noise is injected into the motor, and averages the position read by the encoder. This provides sub-count resolution on the position, and a greater resistance to calibration error caused by friction and external loads, which can be especially beneficial in the stratosphere, where extreme temperature and other environmental factors can affect operation of an LTA craft. Random noise may be generated by commanding the stepper driver to make partial steps forward and backwards around a reference position, such that the average of the positions is the reference position. This may be done via a predetermined operating mode to facilitate this, but it may also be implemented via the pulse signal driving forwards and backwards.

This calibration approach creates a high efficiency stepper drive system that can compensate for encoder error and can fall back to encoder-less operation more effectively than a brushless DC motor. Calibration can be employed both for despin between the envelope and payload. Calibration may also be employed with the pointing actuator, such as via a calibration routine implemented by the lateral propulsion controller 722.

In one scenario, on despin, when motor power is commanded to increase in response to the load, the controller increases the voltage applied to the stepper motor. The current is monitored but is not acted upon until it passes a limit, such as a predetermined threshold. Here, if the load continues to increase, the rotational speed is reduced while current is maintained at a maximum selected value. By way of example, despin may have a current threshold on the order of 1.5 A—1.7 A. Once the motor current reaches this threshold, the output speed is reduced while the motor current is maintained. If the load remains excessive the output may even reverse direction.

This scenario allows for extremely smooth motion of the despin mechanism, since the torque ripple in voltage control mode is allowed to converge to a constant value, while in current controlled mode the current is always oscillating around a setpoint, which causes vibration. However, this drive method imposes limits on the maximum motor winding inductance and limits the motor's maximum speed, resulting in restricting this to slow, low power applications such as despin. Note that a voltage setpoint may be set as a function of a mechanical load associated with the despin mechanism in the voltage control mode. And a current setpoint may be set as a function of a mechanical load associated with the stepper motor in the current control mode.

In contrast, lateral propulsion control may employ higher power, higher speeds and/or higher torque than what is used during despin. For instance, the higher torque is due to having to counteract gyroscopic precession from the propeller. Additionally, a larger motor is used in lateral propulsion control than for despin. Such a larger motor has a correspondingly higher inductance, which can also make the voltage control mode a less beneficial approach. Thus, in a scenario involving lateral propulsion control, such as for managing the thruster pointing direction, a different drive method can be used. In particular, instead of setting a motor voltage in response to load, the controller is configured to set a motor current limit instead. In this case, the drive circuit (e.g., stepper motor driver) then adjusts the motor voltage until the measured motor current reaches the commanded motor current. By way of example, the motor current may range from 0.1 to 1.5 A. This enables adjustment of the pointing direction of the lateral propulsion system (thruster pointing direction) with reference to another portion of the LTA platform. This approach allows for power savings and feedback on the stepper loading over traditional open loop stepper control This control scheme for a lateral propulsion assembly is much more tolerant of higher inductance motors, allowing the use of larger motors at higher speeds. A possible downside would be a higher torque ripple due to coarser resolution of control as compared to voltage control, with slightly less responsiveness to load due to lag from the current control loop, and less optimal performance when running at a very low motor current which could reduce efficiency. However, the LTA platform would readily tolerate such situations without impacting operational performance.

As shown in the example illustrated in FIGS. 4A-B, when the despin mechanism 424 is disposed above the lateral propulsion system 410, then pointing management for the lateral propulsion system may only adjust for the lateral propulsion target heading offset relative to the sun. In particular, in one scenario the lateral propulsion target offset would be equal to the difference between the lateral propulsion target heading and the target heading of the despin mechanism. In this case, the lateral propulsion orientation with reference to the payload can be determined using the rotary encoder of the stepper motor of the lateral propulsion system plus a reference position provided by the position sensor module 646 (e.g., with a Hall Effect sensor). The target accuracy may be +/−1 degree, or more or less. Furthermore, if it is assumed that the accuracy of the despin mechanism meets a threshold criterion, then the despin approach used for the lateral propulsion system may be done using open loop control.

Figure 10:
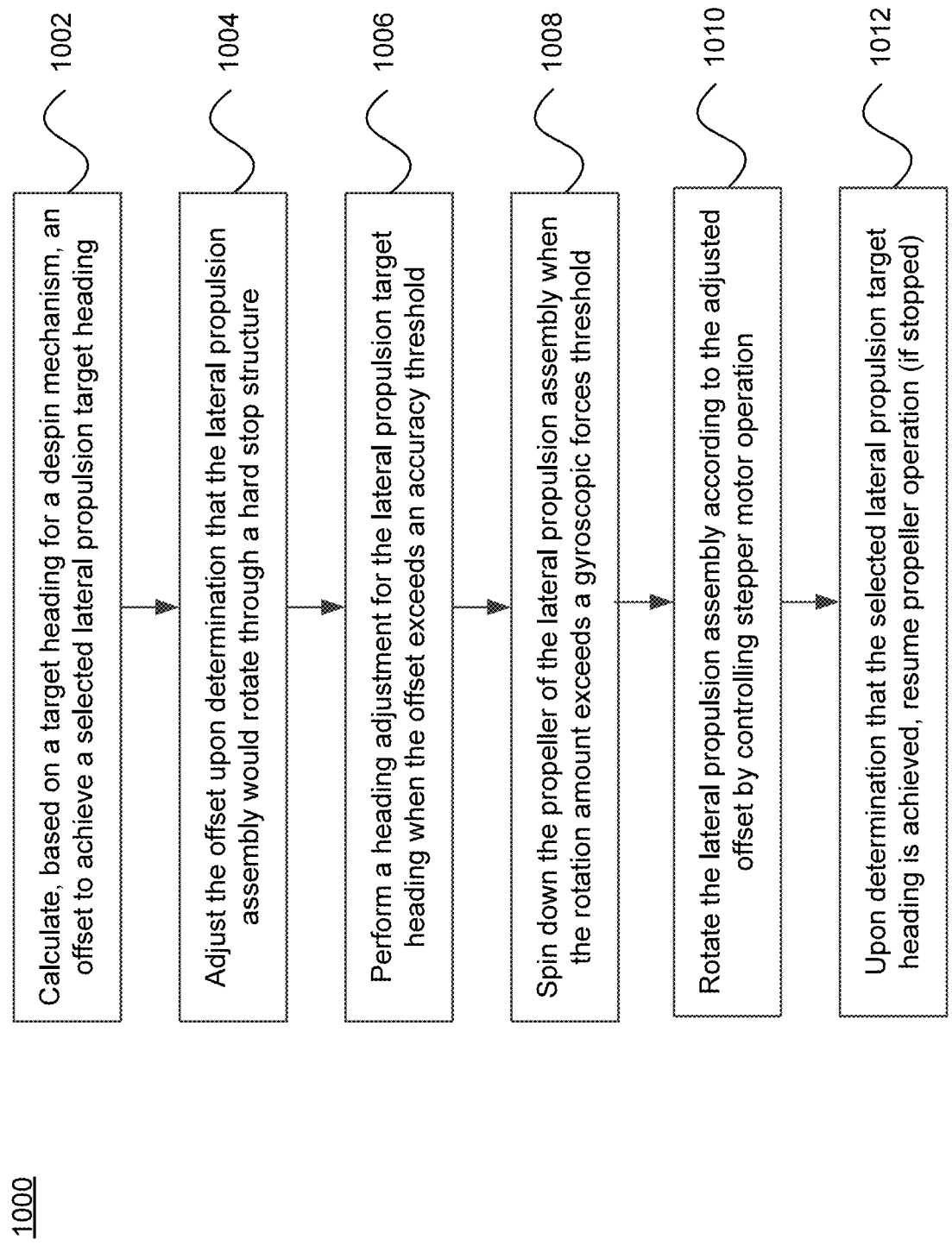
FIG. 10 illustrates an example method of operation in accordance with aspects of the disclosure.

FIG. 10 illustrates a flow diagram 1000, which provides a method of adjusting for the rotation of the lateral propulsion assembly in order to achieve a target heading. As shown in block 1002, the system calculates, based on a target heading for the HAP's despin mechanism, an offset to achieve a selected lateral propulsion target heading. In this example the despin mechanism is disposed above the lateral propulsion controller (i.e., between the lateral propulsion controller and the lighter-than-air envelope). The target heading for the despin mechanism may be received from a controller that monitors or otherwise manages operation of the despin mechanism. At block 1004, the offset may be adjusted based on a determination whether the lateral propulsion assembly would rotate through a hard stop structure (such as shown in FIG. 9B). At block 1006, a heading adjustment for the lateral propulsion target heading is performed when the offset exceeds an accuracy threshold. At block 1008, if the amount to rotate the lateral propulsion assembly would exceed another threshold to minimize gyroscopic forces, the propeller of the lateral propulsion assembly is (temporarily) spun down. For instance, it is desirable to avoid excessive forces to the down connect structure (e.g., down connect member 406) that could disturb the communications platform disposed below in the payload (e.g., payload 404). In an implementation employing a down connect structure, the payload is suspended like a pendulum (see FIG. 4A). In this case, precession forces could induce swaying, which can adversely impact operation of the communication platform. At block 1010, the lateral propulsion assembly is rotated according to the adjusted offset by controlling the stepper motor operation in the manner described above. And at block 1012, upon determination that the selected lateral propulsion target heading has been achieved, the propeller is spun up to operational speed (a selected rate of rotation) in order to achieve a lateral propulsion target heading and/or velocity.

The foregoing examples are not mutually exclusive and may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of operating a lighter-than-air high altitude platform (HAP) in the stratosphere, the method comprising:
    calculating, by one or more processors of the HAP, an offset to achieve a selected lateral propulsion target heading for a lateral propulsion assembly of the HAP;
    determining, by the one or more processors, whether to adjust the selected lateral propulsion target heading to an adjusted lateral propulsion target heading based on an accuracy threshold of the offset;
    spinning down a propeller of the lateral propulsion assembly when a rotation amount in accordance with the offset exceeds a gyroscopic force threshold of the HAP; and
    controlling rotation, by the one or more processors, of a stepper motor of the lateral propulsion assembly according to either the selected lateral propulsion target heading or the adjusted lateral propulsion target heading.

2. The method of claim 1, wherein calculating the offset is based on a target heading for a despin mechanism of the HAP.

3. The method of claim 2, wherein calculating the offset is further based on a location of the lateral propulsion assembly relative to the despin mechanism and a payload of the HAP.

4. The method of claim 1, further comprising adjusting the offset upon a determination that the lateral propulsion assembly would rotate through a hard stop structure.

5. The method of claim 1, further comprising, upon determining that the selected lateral propulsion target heading is achieved according to controlling the rotation, resuming actuation of the propeller at a selected rate of rotation.

6. The method of claim 1, wherein calculating the offset is based on a difference between a rotor position measured by an encoder and a position set by a stepper driver of the lateral propulsion assembly.

7. The method of claim 6, further comprising performing a calibration routine of the stepper motor against the encoder.

8. The method of claim 7, wherein performing the calibration routine includes
driving the stepper motor to a set of locations;
at each location, injecting random noise into the stepper motor;
and averaging a position read by the encoder
at each location.

9. The method of claim 1, wherein controlling the rotation of the stepper motor is performed in accordance with a motor current limit.

10. The method of claim 1, further comprising performing a despin operation using a despin mechanism disposed between an envelope and a payload of the HAP.

11. The method of claim 10, wherein the despin operation is performed according to a voltage control mode, and controlling the rotation of the stepper motor is performed according to a current control mode.

12. The method of claim 11, further comprising:
setting, in the voltage control mode, a voltage setpoint as a function of a mechanical load associated with the despin mechanism; and
setting, in the current control mode, a current setpoint as a function of a mechanical load associated with the stepper motor.

13. The method of claim 1, wherein controlling rotation of the stepper motor is further performed based on a target heading of a directional communications module of the HAP.

14. A lighter-than-air high altitude platform (HAP) configured for operation in the stratosphere, the HAP comprising:
an envelope configured to hold lift gas;
a connecting member operatively coupled at a first end thereof to the envelope, the connecting member having a connecting axis along a length thereof;
a payload coupled to a second end of the connecting member;
a lateral propulsion system rotatably engaged with the connecting member, the lateral propulsion system including:
a propeller assembly having a propeller, and
a control assembly operatively coupled to the propeller assembly and configured to rotate the propeller in a clockwise or counterclockwise direction about a propeller axis, the control assembly also being configured to rotate the lateral propulsion assembly along the connecting axis of the connecting member; and
one or more processors configured to control operation of the lateral propulsion system, the one or more processors being configured to:
calculate an offset to achieve a selected lateral propulsion target heading for the lateral propulsion system;
determine whether to adjust the selected lateral propulsion target heading to an adjusted lateral propulsion target heading based on an accuracy threshold of the offset;
control rotation of a stepper motor of the control assembly according to either the selected lateral propulsion target heading or the adjusted lateral propulsion target heading; and, perform a despin operation using a despin mechanism, wherein the despin operation is performed in a voltage control mode according to a voltage setpoint set as a function of a mechanical load associated with the despin mechanism; and wherein the control of the rotation of the stepper motor is performed in a current control mode according to a current setpoint set as a function of a mechanical load associated with the stepper motor.

15. The HAP of claim 14, wherein calculation of the offset is based on a difference between a rotor position measured by an encoder of the lateral propulsion system and a position set by a stepper driver of the lateral propulsion system.

16. The HAP of claim 14, wherein rotation control of the stepper motor is further performed based on a target heading of a directional communications module of the payload.

17. The HAP of claim 14, wherein the despin mechanism is configured to adjust for a relative rotation of the envelope with respect to the payload.

18. The HAP of claim 17, wherein calculation of the offset is based on a target heading for the despin mechanism.

* * * * *